US011636095B2

(12) United States Patent
Li et al.

(10) Patent No.: US 11,636,095 B2
(45) Date of Patent: Apr. 25, 2023

(54) SYSTEM AND METHOD FOR PROVIDING A REPRESENTATIONAL STATE TRANSFER PROXY SERVICE FOR A BLOCKCHAIN CLOUD SERVICE

(71) Applicant: ORACLE INTERNATIONAL CORPORATION, Redwood Shores, CA (US)

(72) Inventors: Jared Li, Beijing (CN); Pierce Shi, Beijing (CN); Shi Xiang Zhou, Beijing (CN); Weiguo Zhu, Beijing (CN); Sheng Zhu, Beijing (CN); Shun Li, Beijing (CN); Jim Jin, Beijing (CN); Todd Little, Palatine, IL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/704,976

(22) Filed: Dec. 5, 2019

(65) Prior Publication Data

US 2020/0110740 A1 Apr. 9, 2020

Related U.S. Application Data

(63) Continuation of application No. 16/141,339, filed on Sep. 25, 2018, now Pat. No. 10,528,551.
(Continued)

(51) Int. Cl.
*G06F 16/23* (2019.01)
*G06F 9/54* (2006.01)
(Continued)

(52) U.S. Cl.
CPC ........ *G06F 16/2379* (2019.01); *G06F 9/5077* (2013.01); *G06F 9/541* (2013.01);
(Continued)

(58) Field of Classification Search
None
See application file for complete search history.

(56) References Cited

U.S. PATENT DOCUMENTS

| 9,870,508 B1 | 1/2018 | Hodgson et al. |
| 10,123,202 B1 | 11/2018 | Polehn et al. |

(Continued)

FOREIGN PATENT DOCUMENTS

| CN | 102144371 | 6/2015 |
| CN | 106101242 | 11/2016 |

(Continued)

OTHER PUBLICATIONS

"Chaincode for Operators", retrieved from https://web.archive.org/web/20170731011000/http://hyperledger-fabrics-docs.readthedocs.io:80/en/latest/chaincode4noah.html on Jan. 23, 2019, 8 pages.
(Continued)

*Primary Examiner* — Umut Onat
(74) *Attorney, Agent, or Firm* — Tucker Ellis LLP

(57) ABSTRACT

Described herein are systems and methods for implementing a distributed ledger a blockchain cloud service. The blockchain cloud service can include nodes of the distributed ledger and a REST proxy service component. The REST proxy service uses a service development kit for the distributed ledger to communicate with the distributed ledger, and can provide REST APIs for use by client applications to query through chaincodes, synchronously or asynchronously invoke transactions through the chaincodes, get transaction statuses, and get BCS proxy versions. The REST proxy service component can authenticate REST calls, and translate the REST calls into remote procedural calls, for use in interfacing with the distributed ledger. The REST proxy service component can further provide REST APIs that support the same functions which are provided by the BCS
(Continued)

management console component, and provide a user interface for client applications to consume the BCS instance.

20 Claims, 18 Drawing Sheets

Related U.S. Application Data

(60) Provisional application No. 62/565,999, filed on Sep. 29, 2017.

(51) Int. Cl.

| | | |
|---|---|---|
| *G06Q 20/06* | (2012.01) | |
| *H04L 9/06* | (2006.01) | |
| *G06F 16/18* | (2019.01) | |
| *G06F 16/182* | (2019.01) | |
| *G06F 9/50* | (2006.01) | |
| *G06Q 20/38* | (2012.01) | |
| *H04L 9/08* | (2006.01) | |
| *H04L 12/24* | (2006.01) | |
| *H04L 29/06* | (2006.01) | |
| *H04L 29/08* | (2006.01) | |
| *G06F 16/27* | (2019.01) | |
| *G06F 21/62* | (2013.01) | |
| *H04L 9/32* | (2006.01) | |
| *H04L 9/40* | (2022.01) | |
| *H04L 67/565* | (2022.01) | |
| *H04L 41/5054* | (2022.01) | |
| *H04L 67/1097* | (2022.01) | |
| *H04L 9/00* | (2022.01) | |

(52) U.S. Cl.
CPC .......... *G06F 9/547* (2013.01); *G06F 16/1805* (2019.01); *G06F 16/1834* (2019.01); *G06F 16/27* (2019.01); *G06F 21/6218* (2013.01); *G06Q 20/06* (2013.01); *G06Q 20/065* (2013.01); *G06Q 20/382* (2013.01); *G06Q 20/3823* (2013.01); *H04L 9/0637* (2013.01); *H04L 9/0861* (2013.01); *H04L 9/3239* (2013.01); *H04L 41/5054* (2013.01); *H04L 63/08* (2013.01); *H04L 63/123* (2013.01); *H04L 67/1097* (2013.01); *H04L 67/565* (2022.05); *G06Q 2220/00* (2013.01); *H04L 9/50* (2022.05)

(56) References Cited

U.S. PATENT DOCUMENTS

| | | | |
|---|---|---|---|
| 10,229,270 B2 | 3/2019 | Campagna | |
| 10,310,824 B2 | 6/2019 | Eksten | |
| 10,452,998 B2 | 10/2019 | Cuomo et al. | |
| 10,528,551 B2* | 1/2020 | Li | G06Q 20/382 |
| 10,601,900 B2* | 3/2020 | Chen | G06Q 20/0655 |
| 10,691,763 B2 | 6/2020 | Han et al. | |
| 10,756,990 B1 | 8/2020 | Chakkassery Vidyadharan | |
| 10,762,079 B2* | 9/2020 | Shi | G06F 21/6218 |
| 10,789,104 B2* | 9/2020 | Ivanov | G06F 9/455 |
| 11,128,437 B1 | 9/2021 | Nossik | |
| 11,157,876 B1 | 10/2021 | Knas | |
| 11,431,561 B2 | 8/2022 | Smith | |
| 2012/0110155 A1 | 5/2012 | Adlung et al. | |
| 2013/0046894 A1 | 2/2013 | Said et al. | |
| 2015/0052218 A1* | 2/2015 | Zhang | H04L 67/10 709/217 |
| 2016/0260095 A1 | 9/2016 | Ford | |
| 2016/0292680 A1 | 10/2016 | Wilson, Jr. et al. | |
| 2016/0301739 A1 | 10/2016 | Thompson | |
| 2017/0048079 A1 | 2/2017 | Nethi et al. | |
| 2017/0116693 A1 | 4/2017 | Rae et al. | |
| 2017/0212795 A1 | 7/2017 | Prabhakar et al. | |
| 2017/0243193 A1 | 8/2017 | Manian | |
| 2017/0250972 A1 | 8/2017 | Ronda et al. | |
| 2018/0032383 A1 | 2/2018 | Surcouf et al. | |
| 2018/0130050 A1 | 5/2018 | Taylor et al. | |
| 2018/0167217 A1 | 6/2018 | Brady et al. | |
| 2018/0181756 A1 | 6/2018 | Campagna | |
| 2018/0255090 A1 | 9/2018 | Kozloski et al. | |
| 2018/0302215 A1 | 10/2018 | Salgueiro et al. | |
| 2018/0308072 A1 | 10/2018 | Smith et al. | |
| 2018/0329693 A1 | 11/2018 | Eksten | |
| 2018/0332011 A1 | 11/2018 | Gray | |
| 2018/0343111 A1 | 11/2018 | Chen et al. | |
| 2018/0349706 A1 | 12/2018 | Hodgson et al. | |
| 2019/0089537 A1 | 3/2019 | Gray | |
| 2019/0102409 A1 | 4/2019 | Shi et al. | |
| 2019/0102423 A1 | 4/2019 | Little et al. | |
| 2019/0245856 A1 | 8/2019 | Irwan et al. | |
| 2019/0349426 A1 | 11/2019 | Smith | |

FOREIGN PATENT DOCUMENTS

| | | |
|---|---|---|
| CN | 106228446 | 12/2016 |
| CN | 106790265 | 5/2017 |
| CN | 106850611 | 6/2017 |
| CN | 106897933 | 6/2017 |
| CN | 106952124 | 7/2017 |
| CN | 106982205 | 7/2017 |
| CN | 106991612 | 7/2017 |
| JP | 2015507301 | 3/2015 |
| JP | 2016115301 | 6/2016 |
| JP | 2020503598 | 1/2020 |
| WO | 2017011601 | 1/2017 |
| WO | 2017136956 | 8/2017 |
| WO | 2019067986 | 4/2019 |
| WO | 2019067988 | 4/2019 |
| WO | 2019067989 | 4/2019 |

OTHER PUBLICATIONS

Hofman, et al., "Applying blockchain technology for hyperconnected logistics", 4th International Physical Internet Conference, Jul. 2017, 12 pages.
"Hyperledger Fabric Model", retrieved from https://web.archive.org/web/20170731225254/http://hyperledger-fabric-docs.readthedocs.io:80/en/latest/fabric_model.html# on Jan. 23, 2019, 4 pages.
International Search Report and the Written Opinion of the International Searching Authority dated Jan. 15, 2019 for PCT Application No. PCT/US2018/053555, 13 pages.
International Search Report and the Written Opinion of the International Searching Authority for PCT Application No. PCT/US2018/053553, dated Feb. 4, 2019, 14 pages.
International Search Report and the Written Opinion of the International Searching Authority for PCT Application No. PCT/US2018/053556, dated Feb. 4, 2019, 14 pages.
"Ledger", retrieved from https://web.archive.org/web/20170731010523/http://hyperledger-fabric-docs.readthedocs.io:80/en/latest/ledger.html on Jan. 23, 2019, 4 pages.
Miller, Ron., "Service based on open source Hyperledger Fabric technology", published Mar. 19, 2017, retrieved from https://techcrunch.com/2017/03/19/ibm-unveils-blockchain-as-a-service-based-on-open-service-hyperledger-fabric-technology/ on Feb. 1, 2019, 4 pages.
Tackmann, Bjorn., "Secure Event Tickets on a Blockchain", International Conference on Simulation, Modeling, and Programming for Autonomous Robots, Sep. 2017, pp. 437-444, 8 pages.
"Transaction Flow", retrieved from https://web.archive.org/web/20170804103334/http://hyperledger-fabric-docs.readthedocs.io:80/en/latest/txflow.html on Jan. 23, 2019, 4 pages.
Tschorsh, et al. "Bitcoin and Beyond: A Technical Survey on Decentralized Digital Currencies", IEEE Communications Surveys & Tutorials, vol. 18, No. 3, Aug. 19, 2016, pp. 2084-2123, 40 pages.
Vukolic, Marko., "Rethinking Permissioned Blockchains", Proceedings of the ACM Workshop on Blockchain, Cryptocurrencies and Contracts, Apr. 2017, 6 pages.

(56) References Cited

OTHER PUBLICATIONS

United States Patent and Trademark Office, Office Action dated Feb. 1, 2021 for U.S. Appl. No. 16/141,329, 24 pages.
Abbott, Brendan Michael; "A Security Evaluation Methodology for Container Images", BYU ScholarsArchive, Mar. 1, 2017, 94 pages.
Baldini, et al., "Serverless Computing: Current Trends and Open Problems", InResearch Advances in Cloud Computing, Jun. 10, 2017, 20 pages.
Cachine, Christian; "Architecture of the Hyperledger Blockchain Fabric", InWorkshop on distributed cryptocurrencies and consensus ledgers, Jun. 25, 2016, 4 pages.
Sachin, et al., "Blockchain, cryptography, and consensus", IBM Research, Jun. 2017, 63 pages.
Seijas, et al., "Scripting smart contracts for distributed ledger technology", IACR Cryptology ePrint Archive, Dec. 16, 2016, 30 pages.
Stanciu, Alexandru; "Blockchain based distributed control system for Edge Computing", 2017 21st International Conference on Control Systems and Computer Science, May 29, 2017, pp. 667-671, 5 pages.
United States Patent and Trademark Office, Notice of Allowance dated Apr. 28, 2020 for U.S. Appl. No. 16/141,337, 9 pages.
United States Patent and Trademark Office, Office Action dated May 7, 2020 for U.S. Appl. No. 16/141,329, 22 pages.
Akabane, et al., "Blockchain: Mechanism and Theory", RIC TELECOM, Oct. 28, 2016, First Edition, pp. 198-217, 24 pages.
Honda, Kazuyuki; "Destruction or Evolution of Existing Business Model?: Innovation of Blockchain", 34, Weekly BCN, BCN Inc. Mar. 6, 2017, vol. 1668, p. 20, 5 pages.
"IBM and Docker Announce Strategic Partnership to Deliver Enterprise Applications in the Cloud and on Prem", published on Dec. 4, 2014, retrieved on Nov. 4, 2020 from https://web.archive.org/web/20150110041918/http://www-03.ibm.com/press/us/en/pressrelease/45597.wss, 2 pages.
Sato, et al., "Defining Technical Challenges of Blockchain Platform 'Hyperledger Fabric' through Quarantine Evaluation", IPSJ SIG Technical Report, Feb. 24, 2017, vol. 2017-IOT-36, No. 30., pp. 1-8, 8 pages.
Tateishi, et al., "Practice and Future Tasks of Development of Blockchain Applications", Information Processing Society of Japan, Symposium, Software Engineering Symposium 2017, Information Processing Society of Japan, Aug. 23, 2017, pp. 204-211, 11 pages.
"Understanding the architecture", Docker Docs Ja Project, published on Oct. 27, 2016, retrieved on Nov. 4, 2020 from https://web.archive.org/web/20161027042432/https://docs.docker.jp/engine/introduction/understanding-docker.html, 8 pages.
Vukolic, Marko; "Hyperledger Fabric", IBM Corporation, Jun. 22, 2017, https://docplayer.net/53437090-Hyperledger-fabric-an-open-source-distributed-operating-system-for-permissioned-blockchains-swiss-blockchain-summer-school-lausanne-switzeriand.html, 35 pages.
Japanese Patent Office, Office Action dated Oct. 13, 2020 for Japanese Patent Application No. 2019-546842, 9 pages.
Indian Patent Office, First Examination Report dated Nov. 18, 2020 for Indian Patent Application No. 201947023630, 7 pages.
Japanese Patent Office, Office Action dated Dec. 8, 2020 for Japanese Patent Application No. 2019-552193, 5 pages.
Japanese Patent Office, Notice of Reasons for Refusal dated Mar. 2, 2021 for Japanese Patent Application No. 2019-546842, 15 pages.
China National Intellectual Property Administration, Notification of the First Office dated Mar. 12, 2021 for Chinese Patent Application No. 201880007469.4, 8 pages.
Canadian Intellectual Property Office, Office Action dated Apr. 7, 2021 for Canadian Patent Application No. 3,071,430, 8 pages.
Intellectual Property India, Examination report under sections 12 & 13 of the Patents Act, 1970 and the Patents Rules, 2003 dated Jul. 12, 2021 for Indian Patent Application No. 201947023117, 8 pages.
Intellectual Property India, Examination report under sections 12 & 13 of the Patents Act, 1970 and the Patents Rules, 2003 dated Jul. 13, 2021 for Indian Patent Application No. 201947023641, 7 pages.
European Patent Office, Communication pursuant to Article 94(3) EPC dated Jun. 2, 2021 for EP Application No. 18793321.3, 6 pages.
European Patent Office, Communication pursuant to Article 94(3) EPC dated Oct. 22, 2021 for European Patent Application No. 18789749.1, 8 pages.
Nielsen, Henrik Frystyk: "Proxy Servers and Gateways", Dec. 9, 1996 (Dec. 9, 1996), XP055847596, 1 page, retrieved from the Internet: URL:https://www.w3.org/Library.old/User/Using/Proxy.html [retrieved on Oct. 5, 2021].
Japanese Patent Office, Decision to Grant a Patent dated Nov. 26, 2021 for Japanese Patent Application No. 2019546842, 2 pages.
European Patent Office, Communication pursuant to Article 94(3) EPC dated Aug. 4, 2021 for European Patent Application No. 18789552.9, 8 pages.
Scherer, Mattias, "Performance and Scalability of Blockchain Networks and Smart Contract", Spring 2017, Umea University, Degree Project in Computing Science and Engineering, 46 pages.
Manoj, S.P., "Hyperledger & Smart Contracts", Dec. 17, 2015, 40 pages.
Unknown, "Hyperledger Fabric—Architecture Explained", © Copyright Hyperledger 2017. Revision 93f3c9b8, retrieved on Nov. 24, 2021 from: <https://web.archive.org/web/20170903055825/https://hyperledger-fabric.readthedocs.io/en/latest/arch-deep-dive.html>, 17 pages.
United States Patent and Trademark Office, Office Communication dated Dec. 21, 2021 for U.S. Appl. No. 16/141,329, 26 pages.
Brinckman, Adam et al., "A Comparative Evaluation of Blockchain Systems for Application Sharing Using Containers", 2017 IEEE 13th International Conference on eScience, Oct. 24, 2017, pp. 490-497.
United States Patent and Trademark Office, Office Communication dated Mar. 17, 2022 for U.S. Appl. No. 17/008,274, 9 pages.
United States Patent and Trademark Office, Notice of Allowance and Fee(S) Due dated Oct. 5, 2022 for U.S. Appl. No. 17/008,274, 9 pages.
United States Patent and Trademark Office, Notice of Allowance and Fee(S) Due dated Aug. 11, 2022 for U.S. Appl. No. 16/141,329, 9 pages.
China National Intellectual Property Administration, Notification of the First Office Action dated Sep. 26, 2022 for Chinese Patent Application No. 201880007466.0, 10 pages.
China National Intellectual Property Administration, Notification of the First Office Action dated Oct. 8, 2022 for Chinese Patent Application 201880007452.9, 8 pages.

* cited by examiner

SYSTEM AND METHOD FOR PROVIDING A REPRESENTATIONAL STATE TRANSFER PROXY SERVICE FOR A BLOCKCHAIN CLOUD SERVICE

CLAIM OF PRIORITY AND CROSS REFERENCE TO RELATED APPLICATION

This application is a continuation of and claims the benefit of priority to U.S. patent application entitled "SYSTEM AND METHOD FOR PROVIDING A REPRESENTATIONAL STATE TRANSFER PROXY SERVICE FOR A BLOCKCHAIN CLOUD SERVICE", application Ser. No. 16/141,339, filed on Sep. 25, 2018, which application claims the benefit of priority to U.S. Provisional patent application entitled "SYSTEM AND METHOD FOR PROVIDING A BLOCKCHAIN CLOUD SERVICE", Application No. 62/565,999, filed Sep. 29, 2017; and is related to U.S. patent application Ser. No. 15/485,532, entitled "MULTI-TENANT IDENTITY AND DATA SECURITY MANAGEMENT CLOUD SERVICE", filed Apr. 12, 2017 which has subsequently issued on Oct. 3, 2017 as U.S. Pat. No. 9,781,122, which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

This disclosure relates generally to systems and methods for providing distributed ledgers. More particularly the disclosure describes system and methods for providing a representational state transfer (REST) proxy service for interactions between client applications and a blockchain cloud service.

BACKGROUND

A distributed ledger may be broadly described as a digital record of asset ownership. There is no central administrator of the ledger, nor is there a central data store. Instead, the ledger is replicated across many participating nodes in a computing environment that may be geographically spread across multiple sites, countries, or institutions. A consensus protocol ensures that each node's copy of the ledger is identical to every other node's copy. As well, the set of copies may be viewed as a single shared ledger. A distributed ledger may be used by asset owners using cryptographic signature technology, for example, to debit their account and credit another's account.

A blockchain is a data structure can be used to implement tamper-resistant distributed ledgers. Multiple nodes follow a common protocol in which transactions from clients are packaged into blocks, and nodes use a consensus protocol to agree on the next block. Blocks carry cumulative cryptographic hashes making it difficult to tamper with the ledger. Each block can have a reference [hash value] to the previous block in time. In addition, each block can comprise its own hash. The blockchain can be traversed traverse backwards (e.g., up the chain).

A blockchain can be either a permissionless blockchain or a permissioned blockchain. Anyone can join a permissionless blockchain and have a copy of the distributed ledger. Bitcoin and Ethereum are examples of permissionless blockchains. Permissionless blockchains allow anonymous participants to maintain the ledgers, while avoiding control by any single entity. However, identity, accountability and auditability are difficult in light of the anonymity. In contrast, permissioned blockchains accept members by invitation, and allow for levels of trust and accountability by allowing explicitly authorized parties to maintain the ledgers.

The HYPERLEDGER FABRIC is an example of a permissioned blockchain. The HYPERLEDGER FABRIC, as an enterprise-grade, open-source distributed ledger framework and code base, is an implementation of a distributed ledger platform for running smart contracts. It leverages container technology to host smart contracts called "chaincode" that comprise the application logic of the system.

Platform as a Service (PaaS) is a number of cloud services for application development, data management, integration, mobile and Internet of Things (10T. As the demand from cloud services grows, it would be desirable to provide a blockchain a PaaS cloud service. A blockchain PaaS cloud service can provide a pre-assembled platform for building and running smart contracts and maintaining a tamper-proof distributed ledger, while reducing the need for third-party intermediaries. A PaaS blockchain cloud service can also enable the development of blockchain solutions that leverage other PaaS services.

SUMMARY

In accordance with an embodiment, described herein is a system and method for implementing a distributed ledger as a Blockchain Cloud Service (BCS). The BCS can include a complete set of infrastructure services and embedded resources: compute, containers, storage, identity management, and event streaming to enable the setup and execution of a production-ready blockchain. The BCS can provision an underlying infrastructure with the required blockchain network components, a representational state transfer (REST) proxy service component, and a management console component, in response to an administrator specifying one or more parameters.

In accordance with an embodiment, the distributed ledger can be the HYPERLEDGER FABRIC, an implementation of blockchain technology that is intended as a foundation for developing blockchain applications. The HYPERLEDGER FABRIC can provide a modular architecture, and leverages container technology to host smart contracts called "chaincode" that comprise the application logic of the system.

In accordance with an embodiment, the BCS can be based on a PaaS manager (e.g., ORACLE PaaS Service Manager (PSM) platform), and can run in a compute space (e.g., external compute space) on the PaaS Manager. The system utilizes features of the PSM platform including a container runtime service environment (e.g., Docker or ORACLE Application Container Cloud Service (ACCS)) layered using ORACLE Identity Cloud Service (IDCS), ORACLE Load Balancer as a Service (LBaaS), ORACLE Event Hub Cloud Service, and ORACLE Cloud Storage. Each customer blockchain can be provisioned, and can be run as a tenant.

The system supports multiple blockchains, each provisioned and running as a separate tenant in a multitenant environment.

In accordance with an embodiment, the management console component and the REST proxy service component can both be network nodes in a BCS.

In accordance with an embodiment, the management console component facilitate and automate the provisioning, monitoring and configuration of the BCS. The management console component can include a web application running in a script runtime environment, for example, Node.js. The web application can be built on a graphical user interface framework and a web framework; and can include a plurality of custom functions or APIs to communicate with various nodes or services in a BCS instance. The web application can populate information from the various nodes or services in the BCS instance into a view object, for display in a console user interface. The management console component can also provide a plurality of functions for an administrator to start, stop and update one or more nodes in a BCS instance. A set of management REST APIs can be provided by the script runtime environment or can be accessed by the script runtime environment, to support the same functions as provided by the web application.

In accordance with an embodiment, the REST proxy service component (i.e. REST proxy service or REST proxy) within the BCS instance can use a service development kit (SDK) for the distributed ledger in the BCS to communicate with the distributed ledger, and can provide REST APIs for use by client applications to query through chaincodes, synchronously or asynchronously invoke transactions through the chaincodes, get transaction statuses, and get BCS proxy versions. The REST proxy service component can authenticate REST calls, and translate the REST calls into remote procedural calls, e.g., GOOGLE Remote Procedure Calls (gRPC), for use in interfacing with the distributed ledger. The REST proxy service component can further provide REST APIs that support the same functions which are provided by the BCS management console component, and provide a user interface for client applications to consume the BCS instance.

DETAILED DESCRIPTION

Figure 1A:
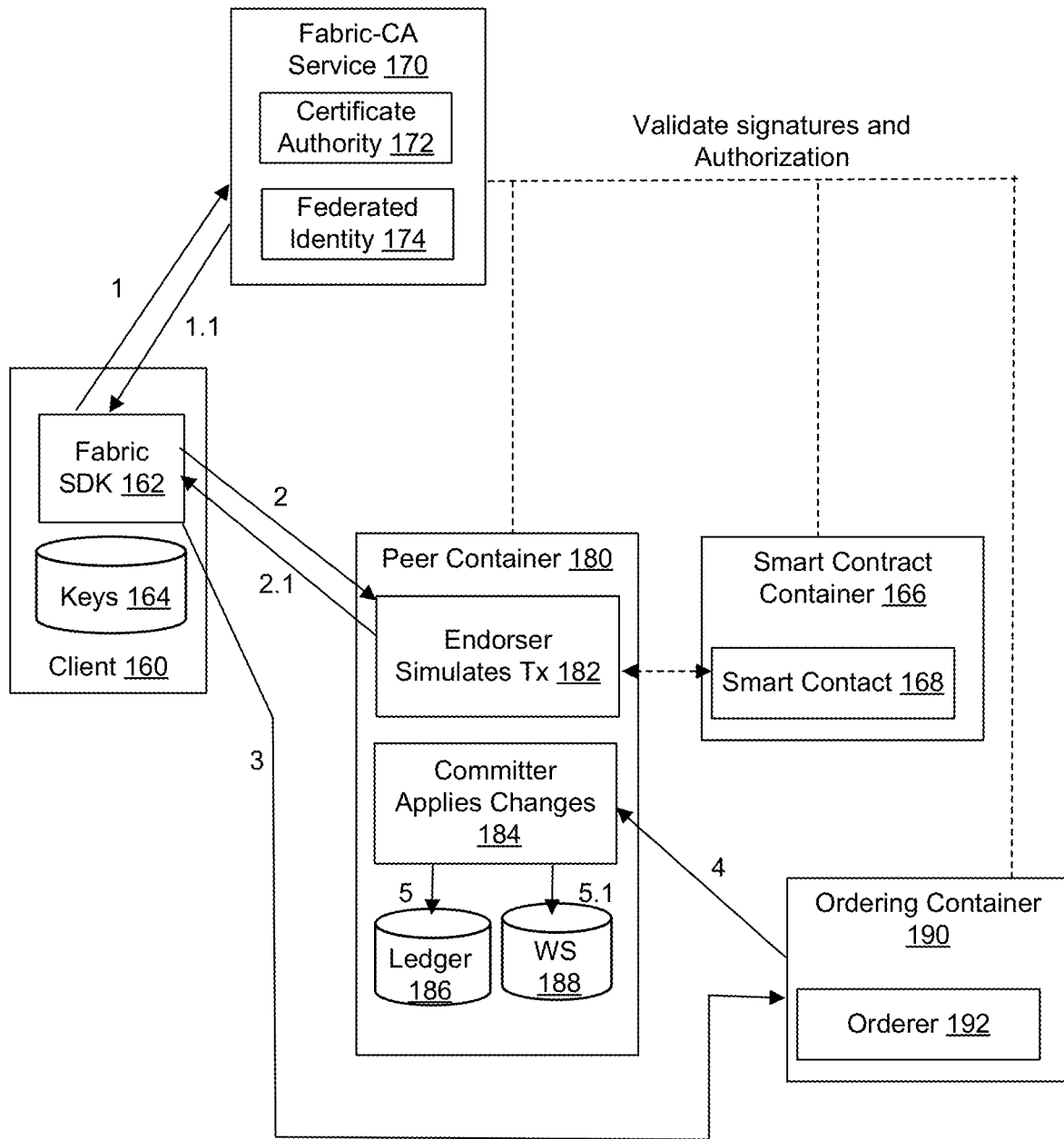
FIG. 1A illustrates transaction flow in a fabric of a Blockchain cloud service system in accordance with an embodiment.

In accordance with an embodiment, described herein is a system and method for implementing a distributed ledger as a cloud service. In a particular embodiment, a permissioned blockchain ledger, e.g., the HYPERLEDGER FABRIC, can be provided as a Blockchain Cloud Service (BCS).

In the following description, the invention will be illustrated, by way of example and not by way of limitation, in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

In accordance with an embodiment, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. Functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere.

Blockchain technology has the potential to dramatically enhance enterprise business value by enabling near real-time, distributed transactions across customers' ecosystems and by enabling secure, tamper-proof data sharing. The HYPERLEDGER FABRIC blockchain incorporates modular architecture, horizontal/cross-industry technology support, and support for enterprise needs.

Introduction

In accordance with an embodiment, a HYPERLEDGER FABRIC is a platform for distributed ledger solutions underpinned by a modular architecture delivering high degrees of confidentiality, resiliency, flexibility and scalability. It is designed to support pluggable implementations of different components and accommodate the complexity and intricacies that exist across the economic ecosystem.

In accordance with an embodiment, a HYPERLEDGER FABRIC delivers an elastic and extensible architecture, distinguishing it from alternative blockchain solutions.

Blockchain—A Distributed Ledger

In accordance with an embodiment, a blockchain network can comprise a distributed ledger that records all the transactions that take place on a network.

In accordance with an embodiment, a blockchain ledger is often described as decentralized because it is replicated across many network participants, each of whom collaborate in its maintenance. Decentralization and collaboration are attributes that mirror the way businesses exchange goods and services in the real world.

In addition to being decentralized and collaborative, the information recorded to a blockchain is append-only, using cryptographic techniques that guarantee that once a transaction has been added to the ledger it cannot be modified. This property of immutability makes it simple to determine the provenance of information because participants can be sure information has not been changed after the fact. In this way, blockchains can be thought of as systems of proof.

Blockchain—Smart Contracts

In accordance with an embodiment, in order to support the consistent update of information—and to enable certain ledger functions (transacting, querying, etc.)—a blockchain network uses smart contracts to provide controlled access to the ledger.

In accordance with an embodiment, smart contracts are not only a key mechanism for encapsulating information and keeping it simple across the network, they can also be written to allow participants to execute certain aspects of transactions automatically.

In accordance with an embodiment, a smart contract can, for example, be written to stipulate the cost of shipping an item that changes depending on when it arrives. With the terms agreed to by both parties and written to the ledger, the appropriate funds change hands automatically when the item is received.

Blockchain—Consensus

In accordance with an embodiment, the process of keeping the ledger transactions synchronized across the network—to ensure that ledgers only update when transactions are approved by the appropriate participants, and that when ledgers do update, they update with the same transactions in the same order—can be referred to as consensus.

In accordance with an embodiment, a blockchain can be thought of as a shared, replicated transaction system which is updated via smart contracts and kept consistently synchronized through a collaborative process called consensus.

Advantages of Blockchain

In accordance with an embodiment, the currently available transactional networks are versions of networks that have existed since business records have been kept. The members of a business network transact with each other, but each member maintains separate records of their transactions. As well, objects of the transactions can have their provenance established each time they are sold to ensure that the business selling an item possesses a chain of title verifying their ownership of it.

In accordance with an embodiment, despite current business networks being modernized by computing systems, unified systems for managing the identity of network participants do not exist, establishing provenance is laborious as it takes days to clear securities transactions (the world volume of which is numbered in the many trillions of dollars), contracts must be signed and executed manually, and every database in the system contains unique information and therefore represents a single point of failure.

Blockchain, in accordance with an embodiment, provides an alternative to many of the inefficiencies represented by the standard system of transactions, by providing a standard method for establishing identity on the network, executing transactions, and storing data.

In accordance with an embodiment, in a blockchain network, each participant in it has its own replicated copy of the ledger. In addition to ledger information being shared, the processes which update the ledger are also shared. Unlike other systems, where a participant's private programs are used to update their private ledgers, a blockchain system has shared programs to update shared ledgers.

In accordance with an embodiment, with the ability to coordinate business networks through a shared ledger, blockchain networks can reduce the time, cost, and risk associated with private information and processing while improving trust and visibility.

Hyperledger Fabric

In accordance with an embodiment, HYPERLEDGER FABRIC, like other blockchain technologies, has a ledger, uses smart contracts, and is a system by which participants manage their transactions.

In accordance with an embodiment, where HYPERLEDGER FABRIC differs from some other blockchain systems is that it is private and permissioned. Rather than the "proof of work" some blockchain networks use to verify identity (allowing anyone who meets those criteria to join the network), the members of a HYPERLEDGER FABRIC network enroll through a membership services provider.

In accordance with an embodiment, HYPERLEDGER FABRIC also offers several pluggable options. Ledger data can be stored in multiple formats, consensus mechanisms can be switched in and out, and different MSPs (Membership Service Providers) are supported.

In accordance with an embodiment, HYPERLEDGER FABRIC also offers the ability to create channels, allowing a group of participants to create a separate ledger of transactions. This allows for an option for networks where some participants might be competitors and not want every transaction they make—a special price they are offering to some participants and not others, for example—known to every participant. If two participants form a channel, then those participants—and no others—have copies of the ledger for that channel.

Shared Ledger

In accordance with an embodiment, a HYPERLEDGER FABRIC has a ledger subsystem comprising two components: the world state and the transaction log. Each participant has a copy of the ledger to every HYPERLEDGER FABRIC network they belong to.

In accordance with an embodiment, the world state component describes the state of the ledger at a given point in time. It is the database of the ledger. The transaction log component records all transactions which have resulted in the current value of the world state. It is the update history for the world state. The ledger, then, is a combination of the world state database and the transaction log history.

In accordance with an embodiment, the shared ledger has a replaceable data store for the world state. By default, this is a LevelDB key-value store database. The transaction log does not need to be pluggable. It simply records the before and after values of the ledger database being used by the blockchain network.

Smart Contracts

In accordance with an embodiment, HYPERLEDGER FABRIC smart contracts are written in chaincode and are invoked by an application external to the blockchain when that application needs to interact with the ledger. In most cases chaincode only interacts with the database component of the ledger, the world state (querying it, for example), and not the transaction log.

Consensus

In accordance with an embodiment, transactions are written to the ledger in the order in which they occur, even though they might be between different sets of participants within the network. For this to happen, the order of transactions is established and a method for rejecting bad transactions that have been inserted into the ledger in error (or maliciously) can be put into place.

In accordance with an embodiment, HYPERLEDGER FABRIC allows a network entity (e.g., a network user, peer, starter) to select a consensus mechanism that best represents the relationships that exist between participants. As with privacy, there is a spectrum of needs; from networks that are highly structured in their relationships to those that are more peer-to-peer.

Chaincode

In accordance with an embodiment, chaincode can comprise software defining an asset or assets, and the transaction instructions for modifying the asset(s)—it is the business logic. Chaincode enforces the rules for reading or altering key value pairs or other state database information. Chaincode functions execute against the ledger current state database and are initiated through a transaction proposal. Chaincode execution results in a set of key value writes (write set) that can be submitted to the network and applied to the ledger on all peers.

Ledger Features

In accordance with an embodiment, a ledger is the sequenced, tamper-resistant record of all state transitions in the fabric. State transitions are a result of chaincode invocations ('transactions') submitted by participating parties. Each transaction results in a set of asset key-value pairs that are committed to the ledger as creates, updates, or deletes.

In accordance with an embodiment, the ledger is comprised of a blockchain to store the immutable, sequenced record in blocks, as well as a state database to maintain current fabric state. There can be one ledger per channel, with each channel comprising a separate ledger of transactions visible to a particular group of participants. Each peer maintains a copy of the ledger for each channel of which they are a member.

Privacy Through Channels

In accordance with an embodiment, HYPERLEDGER FABRIC employs an immutable ledger on a per-channel basis, as well as chaincodes that can manipulate and modify the current state of assets (i.e. update key value pairs). A ledger exists in the scope of a channel—it can be shared across the entire network (assuming every participant is operating on one common channel)—or it can be privatized to only include a specific set of participants.

In accordance with an embodiment, in the latter scenario, such participants can create a separate channel and thereby isolate/segregate their transactions and ledger. In order to allow for scenarios that want to bridge the gap between total transparency and privacy, chaincode can be installed only on peers that need to access the asset states to perform reads and writes (e.g., if a chaincode is not installed on a peer, it will not be able to properly interface with the ledger). To further obfuscate the data, values within chaincode can be encrypted (in part or in total) using common cryptographic algorithms such as AES (Advanced Encryption Standard) before appending to the ledger.

Security & Membership Services

In accordance with an embodiment, HYPERLEDGER FABRIC provides for a transactional network where all participants have known identities. Public Key Infrastructure is used to generate cryptographic certificates which are tied to organizations, network components, and end users or client applications. As a result, data access control can be manipulated and governed on the broader network and on channel levels. This "permissioned" notion of HYPERLEDGER FABRIC, coupled with the existence and capabilities of channels, helps address scenarios where privacy and confidentiality are paramount concerns.

Consensus

In accordance with an embodiment, in a distributed ledger, consensus can encompass more than simply agreeing upon the order of transactions. This differentiation is highlighted in HYPERLEDGER FABRIC through its fundamental role in the entire transaction flow, from proposal and endorsement, to ordering, validation and commitment. Consensus can be defined as the full-circle verification of the correctness of a set of transactions comprising a block.

In accordance with an embodiment, consensus is achieved when the order and results of a block's transactions have met the explicit policy criteria checks. These checks and balances take place during the lifecycle of a transaction, and include the usage of endorsement policies to dictate which specific members must endorse a certain transaction class, as well as system chaincodes to ensure that these policies are enforced and upheld. Prior to commitment, the peers can employ these system chaincodes to make sure that enough endorsements are present, and that they were derived from the appropriate entities. Moreover, a versioning check can take place during which the current state of the ledger is agreed or consented upon, before any blocks containing transactions are appended to the ledger. This final check provides protection against double spend operations and other threats that might compromise data integrity, and allows for functions to be executed against non-static variables.

In accordance with an embodiment, in addition to the endorsement, validity and versioning checks that take place, there are also ongoing identity verifications happening in the transaction flow. Access control lists are implemented on hierarchal layers of the network (ordering service down to channels), and payloads are repeatedly signed, verified and authenticated as a transaction proposal passes through the different architectural components. Consensus is not limited to the agreed upon order of a batch of transactions, but rather, it is a process that is achieved as a byproduct of the ongoing verifications that take place during a transaction's flow from proposal to commitment.

Blockchain Cloud Service—Architecture

In accordance with an embodiment, a system, such as a cloud system (e.g., Blockchain Cloud Service (BCS)), can utilized the above described HYPERLEDGER FABRIC as a starting point. Such a system offers a highly advanced and differentiated enterprise-grade distributed ledger cloud platform that allows for the building of new blockchain-based applications and/or the extension of existing SaaS, PaaS, and IaaS and on-premises applications.

In accordance with an embodiment, the system can support mission-critical enterprise needs such as scalability, security, robustness, integration, and performance to remove barriers to adoption and support blockchain applications in production. The system allows for users to deploy, configure, manage and monitor blockchain and reduce the cost for deploying blockchain in enterprises by providing BCS as a Platform as a Service (PaaS) Cloud solution. The system also accelerates the development and integration of blockchain applications with other platforms. The system allows SaaS cloud customers to enable their enterprise processes like Procurement, Payments, Trade Finance, Accounting, HR, CX to securely share data and conduct distributed transactions with 3rd party applications and external distributed ledger technologies using blockchain cloud platform.

In accordance with an embodiment, the system is a cloud service based on a PaaS manager (e.g., ORACLE PaaS Service Manager (PSM) platform). In general, such a system is a managed cloud service that runs in compute space (e.g., external compute space). In embodiments, the system utilizes features of the PSM platform including a container runtime service environment (such as Docker or an Application Container Cloud Service) Layered using ORACLE Identity Cloud Service (IDCS), ORACLE Load Balancer as a Service (LBaaS), ORACLE Event Hub Cloud Service, and ORACLE Cloud Storage. Each customer blockchain can be provisioned, and can be run as a tenant. The system supports multiple blockchains, each provisioned and running as a separate tenant in a multitenant environment.

In accordance with an embodiment, accordingly, the system allows for applications or customer applications to implement a distributed ledger with smart contracts as necessary or desirable for the applications. Clients and users of such a system can be internal or external to cloud—blockchain trust—some blockchain networks may comprise components outside the cloud environment (or could be constrained to a particular cloud).

In accordance with an embodiment, such a system can be useful for a wide variety of application functions in particular in multi-party transactions where trust and identity issues must be resolved. Unlike other blockchain systems, the provided system service is not anonymous. Indeed, identity and auditability are fundamental and integrated elements. Accordingly BCS finds applications in, for example, capital markets, cross-border transactions, financial services, asset transactions, legal regulatory applications, healthcare records, publishing, logistics, traceability, and anti-counterfeiting.

In accordance with an embodiment, as described above, each party on a blockchain has access to the entire database and its complete history (unless the ledger has been provisioned/privatized to certain parties). No single party controls the data or the information. Every party can also verify the records of its transaction partners directly, without an intermediary. Communication occurs directly between peers instead of through a central node. Each node stores and forwards information to all other nodes. Once a transaction is entered in the database and the accounts are updated, the records cannot be altered, because they are linked to every transaction record that came before them (hence the term "chain"). If a transaction is in error, a new transaction must be used to reverse the error, and both transactions are then visible to provisioned users. To add a new valid transaction, participants can agree on its validity via a consensus mechanism. Participants in the blockchain can certify where the asset came from and how the ownership of the asset has changed over time. A digital signature can be used to authenticate document and can be placed in Access Control [varied level of permissions] And Programmability [Executable Business rules].

In accordance with an embodiment, in many multi-party transactions, money is exchanged, when a party receives the assets or services. Typically because of transaction time, one or other party must commits goods or money before the other. In some environments, trust issues are resolved by using an intermediary which holds funds in escrow until completion of conditions in the contract. This resolves trust issues between the original parties. However, such a method adds another centralized party which must be trusted, increasing complexity, and likely the cost of the transaction. Use of smart contracts as part of the provided system can eliminate the need for intermediary—parties can conduct trusted transactions on the blockchain without having an intermediary.

In accordance with an embodiment, advantages of the provided system, such as BCS, include that the information contained therein is distributed. Access is controlled and some privacy can be maintained although auditability is available. Moreover, the blockchain ledger is essentially immutable and cannot be repudiated. The ledger comprises of a list of blocks. Each transaction block contains: Block ID, Previous Hash, Data Hash, Timestamp, Transaction ID List, Actions (1 . . . n), Chaincode ID, Chaincode proposal, Response (r/w set, events, success or failure), Endorsers. As each block contains the previous hash and its own hash, the blocks are inherently ordered and immutable once known/distributed (note: the hash of a present block is a hash of the hash of the previous block and the other data in the present block, hence linking the blocks in a chain). A consensus can resolve discrepancies. Compared to a centralized database or intermediary, there is no need to give undue authority to a centralized authority. The distributed nature of the ledger also augments the fundamental immutability of the blockchain recording technology in that the use of distributed copies—and consensus make it difficult to modify (even where algorithmically possible). Thus, given the ordering of transactions—hacking ledger is nearly impossible if somebody has a copy of the latest block in the chain.

In accordance with some embodiments, as described below, the provided system can be based on the ORACLE PaaS Service Manager (PSM) platform and is augmented with a management console which simplifies/facilitates/automates provisioning, monitoring and configuration of fabric based blockchains. Additionally, a REST proxy service including a unitary REST API is provided to simplify contact between applications and the Blockchain fabric. Developers can build smart contracts, use the management console to deploy the smart contracts, and then let the applications invoke the smart contract on the blockchain either asynchronously (which is the default) or synchronous (if an immediate response is desired). The REST proxy service and API provides both synchronous and asynchronous capabilities depending on the needs of the platform.

In accordance with an embodiment, a fabric-CA server can provide a membership service for a fabric. The fabric-CA server can comprise three parts: authentication for user, authorization for accessing a Blockchain (a group of peers and orders) and a CA server which could deliver certificate to application client, peer and order. fabric-CA can utilize a certificate to implement authentication and authorization. The certificate include two types: enroll certificate for authentication and transaction certificate for authorization. In accordance with an embodiment, an identity service, such as IDCS, can also provide authentication and authorization.

Hyperledger Fabric

As described above, in an embodiment, the provided system can implement a HYPERLEDGER FABRIC providing a distributed ledger platform for running smart contracts. The fabric leverages container technology to host smart contracts called "chaincode" that comprise the application logic of the system. In alternative embodiments the Block Chain Cloud Service implements alternative distributed ledger platforms including for example, the "Tendermint" ledger system as described in U.S. patent application Ser. No. 15/169,622 (U.S. Publication No. 2017/0236120) entitled "Accountability And Trust In Distributed Ledger Systems", filed May 31, 2016, which is incorporated by reference.

In accordance with an embodiment, the distributed ledger protocol of the HYPERLEDGER FABRIC is run by peers. One disadvantage of prior blockchain technologies is that all peers are required to record all transactions. This creates substantial I/O and processor overhead and does not conveniently scale to enterprise-grade systems. The HYPERLEDGER FABRIC distinguishes between two kinds of peers: A validating peer is a node on the network responsible for running consensus, validating transactions, and maintaining the ledger. On the other hand, a non-validating peer is a node that functions as a proxy to connect clients (issuing transactions) to validating peers. A non-validating peer does not execute transactions but it may verify them. The segregation of peer types/function improves the scalability of the system.

In accordance with an embodiment, a feature of the HYPERLEDGER is permissioned blockchain with immediate finality which runs arbitrary smart contracts called chaincode. The user-defined chaincode smart contracts are encapsulated in a container and system chaincode runs in the same process as the peer. Chaincode execution is partitioned from transaction ordering, limiting the required levels of trust and verification across node types, and reducing network overhead.

In accordance with an embodiment, channels in the HYPERLEDGER FABRIC enable multi-lateral transactions with high degrees of privacy and confidentiality required by competing businesses and regulated industries that exchange assets on a common network. The immutable, shared ledger encodes the entire transaction history for each channel, and includes query capability for efficient auditing and dispute resolution. A ledger is provided in the scope of a channel—it can be shared across the entire network (assuming every participant is operating on one common channel)—or it can be privatized to only include a set of participants.

In accordance with an embodiment, the HYPERLEDGER FABRIC implements security through support for certificate authorities (CAs) for TLS certificates, enrollment certificates and transaction certificates. Public Key Infrastructure is used to generate cryptographic certificates which are tied to organizations, network components, and end users or client applications. As a result, data access control can be manipulated and governed on the broader network and on channel levels. This "permissioned" feature of HYPERLEDGER FABRIC, coupled with the existence and capabilities of channels, satisfies privacy and confidentiality needs in multi-party enterprise systems.

In accordance with an embodiment, HYPERLEDGER FABRIC provides the ability to modify assets using chaincode transactions. As described above, Chaincode is software defining an asset or assets, and the transaction instructions for modifying the asset(s).

In accordance with an embodiment, integrated consensus mechanisms have a fundamental role in transaction flow in the HYPERLEDGER FABRIC, from proposal and endorsement, to ordering, validation and commitment. Consensus is, as described above, a verification of the validity of a set of transactions comprising a block. Consensus is ultimately achieved when the order and results of a block's transactions have met the explicit policy criteria checks.

FIG. 1A illustrates transaction flow in a fabric of a system providing a blockchain service. More specifically, the figure illustrates a Blockchain Cloud Service (BCS) system in accordance with an embodiment. At 1, Client 160 uses fabric SDK 162 to access fabric certificate authority 170, 172, 174 to enroll. At 1.1 fabric-CA returns an enrollment certificate to the client 160. At 2, Client 160 uses fabric SDK 162 to access Peer container 180 requesting endorsement from Endorser 182. At 2.1 Endorser 182 returns a signed RWset (read/write set). At 3, the fabric SDK 162 at the client 160 submits the endorsed TX (transaction) which includes RWset and endorser signatures to the ordering service at the ordering container 190. At 4, Orderer 192 delivers the TX batch to Committer 184 in peer container 180. The Orderers are a defined collective of nodes that orders transactions into a block. The ordering service exists independent of the peer processes and orders transactions on a first-come-first-serve basis for all channel's on the network. Committer 184 applies changes to ledger 186 and World State 188 at 5 and 5.1. The fabric certificate authority 170 can be used to validate signatures and authorization for the peer container 180, the smart contract container 166 and 168 (smart contract), and the orderer 192. In addition, the smart contract 168 can communicate with the endorser 182.

In an embodiment, the system can utilize a Kafka cluster as an ordering service. Kafka is a distributed streaming service that supports publish and subscribe semantics. A Kafka cluster runs on a plurality of servers and stores streams of records in categories called topics. Each record comprises of a key a value and a timestamp. Kafka can thus be used as an ordering service comprising ordering service nodes (OSN-n), and a Kafka cluster. The ordering service client can be connected to multiple OSNs. The OSNs do not communicate with each other directly. These ordering service nodes (OSNs) (1) do client authentication, (2) allow clients to write to a chain 1 or read from it using a simple interface, and (3) they also do transaction filtering and validation for configuration transactions that either reconfigure an existing chain or create a new one. Messages (records) in Kafka get written to a topic partition. A Kafka cluster can have multiple topics, and each topic can have multiple partitions. Each partition is an ordered, immutable sequence of records that is continually appended to. Once the OSNs have performed client authentication and transaction filtering, they can relay the incoming client transactions belonging to a certain chain to the chain's corresponding partition. They can then consume that partition and get back an ordered list of transactions that is common across all ordering service nodes.

In accordance with an embodiment, each peer has the capability to be an endorser and a committer. There is a configuration item (e.g., CORE_PEER_ENDORSER_ENABLED) which can enable a peer to be an endorser. When a peer joins a channel, this peer becomes a committer of this channel. When a chaincode is installed on a peer, this peer becomes the candidate endorser for this chaincode. When a client proposes a transaction, it is the client's choice to select which peers to be the endorsers (from the candidate endorsers).

In accordance with an embodiment, the Ordering mechanism for Orderer delivering blocks to Peer are as follows. First, a peer (e.g., a leader peer) delivers a request for new blocks from Orderer by sending its version (the last block number). Next, an Orderer checks Peer's version: a) if it is greater than Orderer, returns an error to Peer, it indicates the ledger in Order are lost, and cannot be recovered from EventHub (in this scenario, Orderer cannot continue work properly); b) if the peer's version is less than Orderer, then Orderer retrieves blocks from local ledger, either in RAM or local file, and send back to peer; or c) if they have the same version, then Orderer blocks until new blocks are available. When a new block data cut from EventHub is ready, the Orderer will put it into local block file or RAM, then deliver thread reads this block from ledger and sends it back to peer. The peer gets this block, and commits it to local ledger, and can then broadcast its latest version to other peers.

BCS System Architecture

Figure 1B:
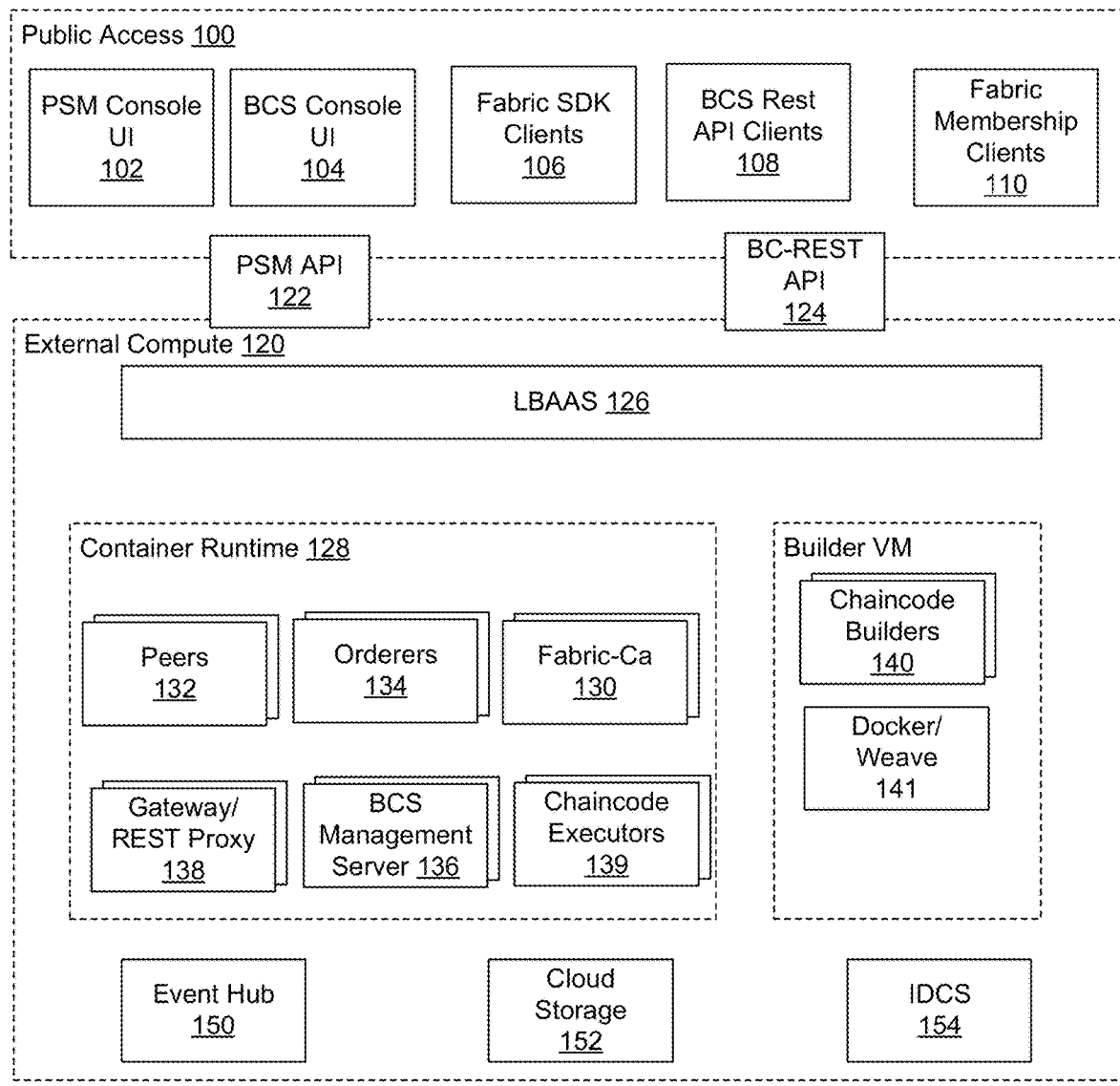
FIG. 1B illustrates a Blockchain cloud service system in accordance with an embodiment.

FIG. 1B illustrates transaction flow in a fabric of a system providing a blockchain service. More specifically, the figure illustrates a Blockchain Cloud Service (BCS) system in accordance with an embodiment. As shown, the Blockchain cloud service components are provisioned in compute space 120 (e.g., external compute space), for example on the ORACLE PaaS Service Manager (PSM) platform. Access to the system is mediated by the PSM API 122 and Blockchain REST API 124. External Compute 120 leverages a load balancing as a service LBaaS 126 to distributed incoming transaction across the available appropriate resources.

In accordance with an embodiment, the BCS is an application-container layered service built with PSM platform on a container runtime service environment (such as Docker or an Application Container Cloud Service) 128. Each of the BCS entities runs on a separate container. Each of BCS entity is one-to-one correspondence to a container runtime service. The Blockchain Cloud Service implements features of the HYPERLEDGER FABRIC described above. Besides the components that construct the basic fabric network, several components are developed to leverage the HYPERLEDGER FABRIC into the Blockchain Cloud Service. These components need separate deployment behaviors and binaries to deploy these components. A Cloud Stack Manager can be used to empower users to automate the provisioning of all services defined by the blueprint as a single unit that is called a stack.

In accordance with an embodiment, the BCS provides an implementation of the HYPERLEDGER FABRIC which is an implementation of a distributed ledger platform for running smart contracts. The BCS leverages container technology to host smart contracts called "chaincode" that comprise the application logic of the system.

In accordance with an embodiment, the distributed ledger protocol of the fabric is run by peers. The fabric distinguishes between two kinds of peers: A validating peer is a node on the network responsible for running consensus, validating transactions, and maintaining the ledger. On the other hand, a non-validating peer is a node that functions as a proxy to connect clients (issuing transactions) to validating peers. A non-validating peer does not execute transactions but it may verify them. Some key features of the fabric release include permissioned blockchain with immediate finality which runs arbitrary smart contracts called chaincode. The user-defined chaincode smart contracts are encapsulated in a container and system chaincode runs in the same process as the peer. The fabric implements a consensus protocol and security through support for certificate authorities (CAs) for TLS certificates, enrollment certificates and transaction certificates.

In accordance with an embodiment, the BCS entities run in layered container instances with container runtime service 128. The containers are created and/or started by provisioning operations of the PSM. The fabric-CA Container 130, is the container in which the BCS fabric CA (Certificate and Authority) component is provided. The BCS Peer (Container) 132 is the container in which the BCS peer network entity that maintains a ledger and runs chaincode containers in order to perform the read/write operations to the ledger component is running. The BCS ordering Container 134 is the container in which the BCS orderer which provides the service to order transactions into a blockchain for all of channels is running. The BCS Chaincode Execution Container 139 is a container created and started by the peer entity. In the container, the chaincode execution unit communicates with the parent peer entity and performs encoding of assets and transaction instructions for modifying the assets in the blockchain.

In accordance with an embodiment, the BCS Chaincode Builder Container 140 is a container created and started by the peer entity. In the container, the chaincode build environment is installed and deployed, and the chaincode execution unit is built in it. A client side fabric SDK 106 provides functionality for accessing the BCS. The Block Chain Cloud Service also leverages Event Hub Cloud Service 150, Cloud Storage Service 152, and Identity Service 154. ORACLE storage cloud service is used as the storage service for BCS.

In accordance with an embodiment, Docker/Weave 141 are container services. Containers provide a way to package software in a format that can run isolated on a shared operating system. Unlike VMs, containers do not bundle a full operating system—instead using libraries and settings required to make the software work are needed. This makes for efficient, lightweight, self-contained systems and guarantees that software will always run the same, regardless of where it's deployed.

In accordance with an embodiment, each BCS instance comprises of different types of nodes. There can be few (e.g., 0 or more) to multiple peer nodes in a BCS instance. There can be few (e.g., 0) to multiple orderer nodes in a BCS instance. There are 1 to multiple fabric-CA nodes in a BCS instance, one per VM. BCS Gateway: There can be few (e.g., 0) to multiple BCS gateways in a BCS instance. BCS console is also a component of a BCS instance. There is only one BCS console in a BCS instance.

In accordance with an embodiment, the BCS Management Server (Console) 136 is a component of BCS, which provides rich monitor, management, and view functionalities to the BCS stack instance as described in more detail below. BCS Gateway (REST proxy) 138 is a new component of BCS, and provides a REST API interface to customers/clients and is used to access the fabric to perform transactions as described in more detail below.

In accordance with an embodiment, on the public access client-side 100, A PSM Console UI 102 allows for management of Platform Service Manager. A BCS Console UI 104 allows for control of the BCS Management Server. A variety of different client types can access the BCS service including fabric SDK clients 106, BCS REST Clients 108, and fabric Membership Clients 110.

In accordance with an embodiment, blueprints can be defined for each type of container listed of above as an individual service type. The ORACLE Cloud Stack Manager uses the blueprints to automate the provisioning of all of individual service types into a single stack unit. The benefit of defining a service type for each of BCS entity is ease of upgrading and maintaining the various running entities. The container runtime service layered service supports four types of operations: CREATE_SERVICE, DELETE_SERVICE, SCALE_SERVICE, and Start/Stop/Restart. These operations can be applied service by service.

In accordance with an embodiment, in the HYPERLEDGER FABRIC, the ordering service component uses the Apache Kafka to provide ordering service and support for multiple chains in a crash fault tolerant manner. Accordingly, in the BCS cloud service, the ordering service component will uses the OEHCS (ORACLE Event Hub Cloud Service that delivers the power of Kafka as a managed streaming data platform and can be integrated with the rest of ORACLE's cloud.)

Figure 1C:
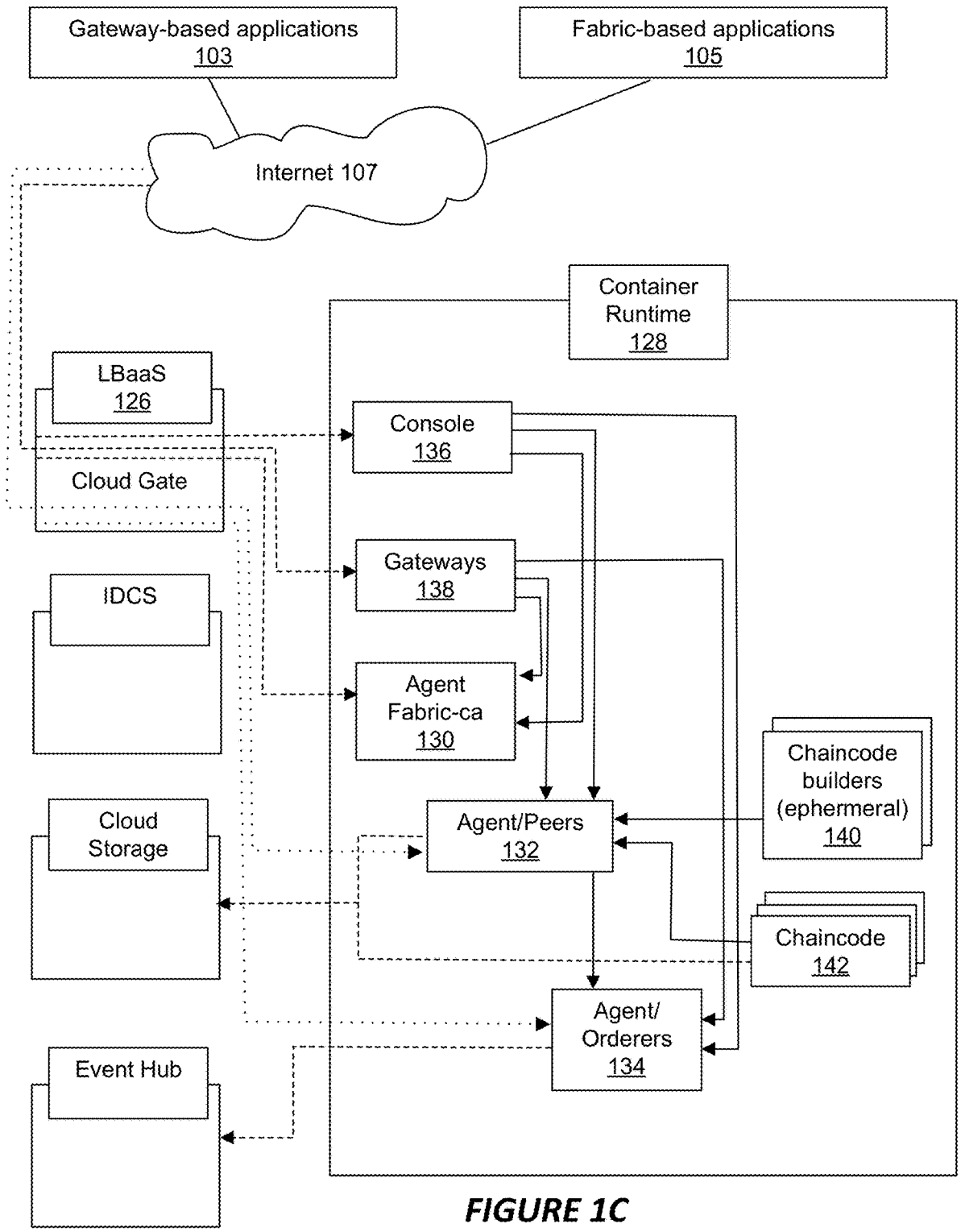
FIG. 1C illustrates a BCS system in accordance with an embodiment.

FIG. 1C illustrates a BCS system in accordance with an embodiment. More specifically, the figure shows a BCS runtime.

In accordance with an embodiment, clients, such as gateway-based applications 103 and/or fabric-based applications 105 can communicate with a container runtime service instance 128, via a network, such as the internet 107, and via a front end, such as a load balancer LBaaS 126, which can comprise CloudGate (discussed below). Incoming calls can comprise REST communication (shown as the heavier dashed line in the figure), or, in certain situations, incoming gRPC communication (shown as the lighter dashed line in the figure). Incoming REST communication can be directed to a gateway 138 (which can comprise a REST API/REST Proxy), a console 136, or an Agent fabric-CA 130 (as discussed above). The REST communication, now transformed/translated to internal calls (gRPC), can interface with the instance of the blockchain fabric/HYPERLEDGER (including the agent/peers 132, agent/orderers 134, chaincode 142, and chaincode builders 140). Meanwhile, incoming gRPC communication can be directly transmitted to, for example, the agent/peers 132, and the agent/orderers 134, to interface with the blockchain/HYPERLEDGER.

In accordance with an embodiment, once transactions within the container runtime service instance have occurred, the container runtime service instance can then, for example, persist the ledger at the cloud storage via REST communication, or can communicate with the Event Hub, likewise via REST communication.

In accordance with an embodiment, while only one container runtime service instance is shown in the figure, one of skill in the art would readily understand that there can exist one or multiple container runtime service instances that the clients (such as gateway-based applications 103 and/or fabric-based applications 105) can communicate with via the described BCS runtime.

Figure 1D:
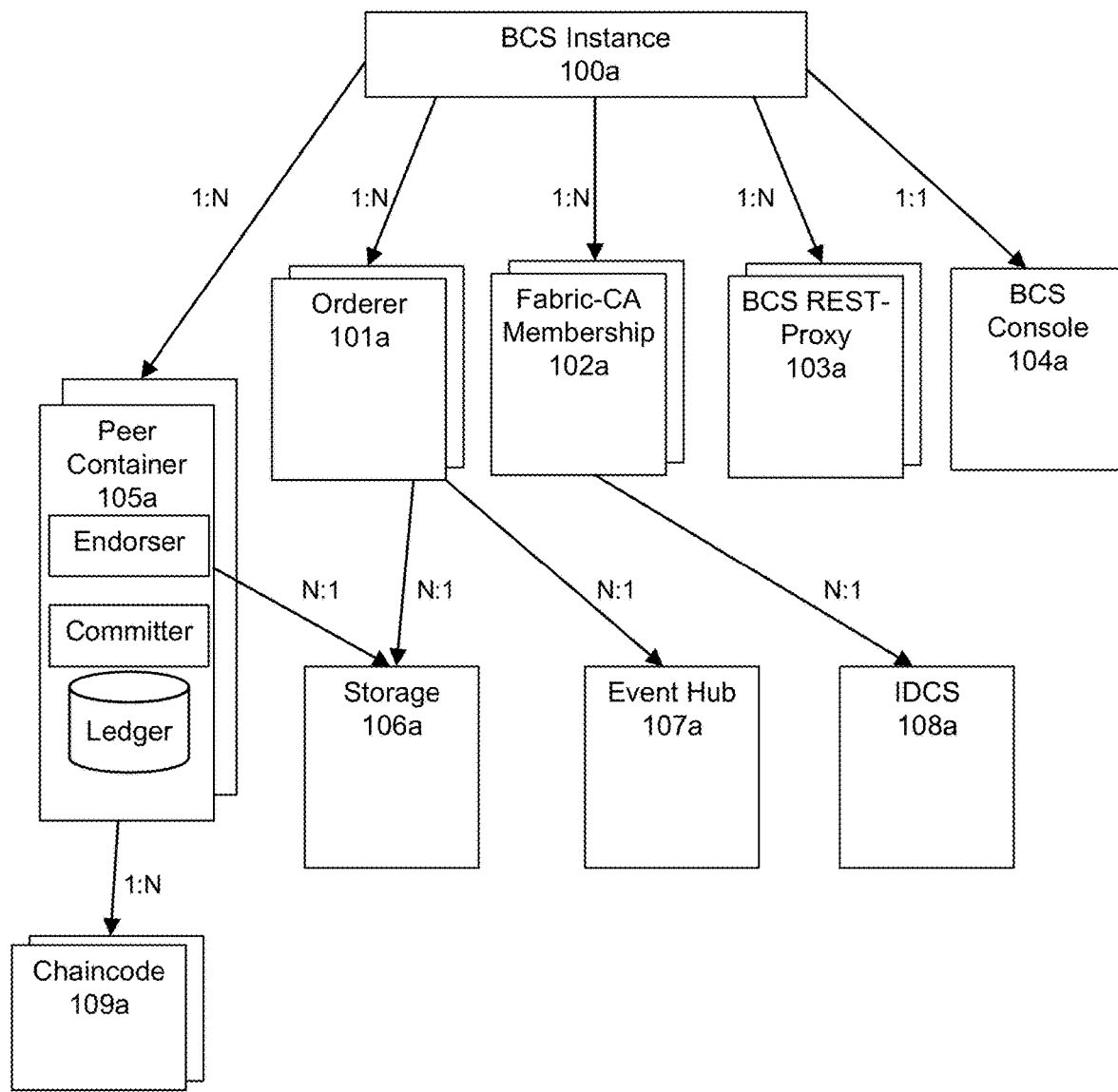
FIG. 1D illustrates a BCS system in accordance with an embodiment.

FIG. 1D illustrates a BCS system in accordance with an embodiment. More particularly, the figure shows the component cardinality within a BCS system, namely ratios of components with respect to each BCS instance.

In accordance with an embodiment, for each BCS instance 100a: an orderer 101a can be provided in the ratio of 1:N; a fabric-CA membership 102a can be provided in a ratio of 1:N; a BCS REST-Proxy 103a can be provided in the ratio of 1:N; a BCS console 104a can be provided in a ratio of 1:1, and a peer container 105a can be present in the ratio of 1:N.

In accordance with an embodiment, each peer container can comprise an endorser, which can simulate a transaction, and a committer, which can application changes to a ledger, which is also provided at the peer container.

In accordance with an embodiment, chaincode 109a can be provided at a ratio of 1:N with respect to the peer container. In addition storage 106a can be provided at a ratio of N:1 with respect to the peer container and the orderer. As well, Event Hub 107a can be provided at a ratio of N:1 with respect to the peer container and the orderer. IDCS 108a can be provided at a ratio of N:1 with respect to the fabric-CA membership.

Figure 1E:
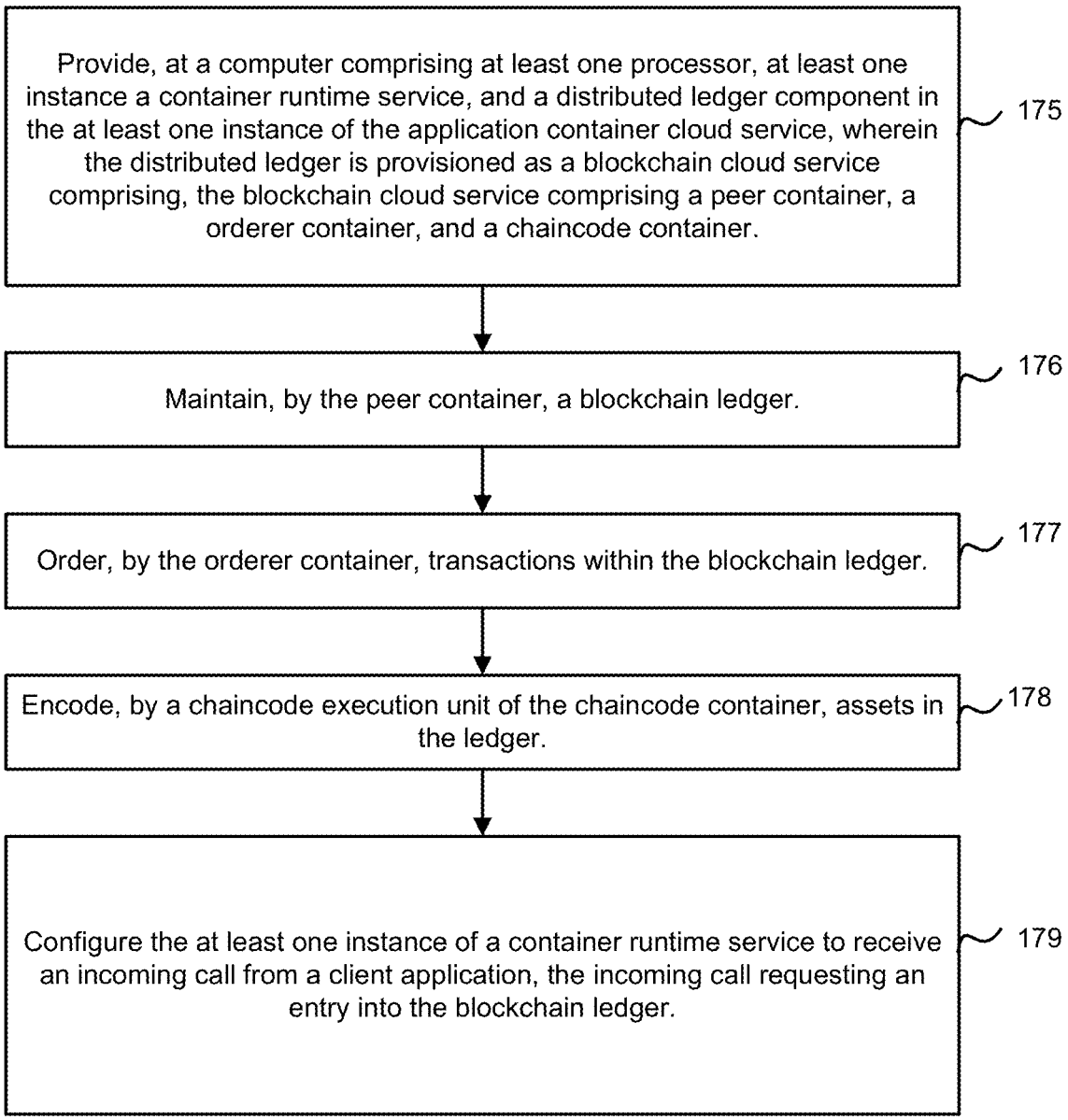
FIG. 1E is a flowchart of a method for providing an interface for a blockchain cloud service, in accordance with an embodiment.

FIG. 1E is a flowchart of a method for providing an interface for a blockchain cloud service, in accordance with an embodiment.

In accordance with an embodiment, at step 175, a method can provide, at a computer comprising at least one processor, at least one instance an container runtime service, and a distributed ledger component in the at least one instance of the container runtime service, wherein the distributed ledger is provisioned as a blockchain cloud service comprising, the blockchain cloud service comprising a peer container, a ordering container, and a chaincode container.

In accordance with an embodiment, at step 176, the method can maintain, by the peer container, a blockchain ledger.

In accordance with an embodiment, at step 177, the method can order, by the ordering container, transactions within the blockchain ledger.

In accordance with an embodiment, at step 178, the method can encode, by a chaincode execution unit of the chaincode container, assets in the ledger.

In accordance with an embodiment, at step 179, the method can configure the at least one instance of the container runtime service to receive an incoming call from a client application, the incoming call requesting an entry into the blockchain ledger.

Blockchain Cloud Service (BCS) Gateway

In accordance with an embodiment, BCS Gateway (BCSGW) comprises a network node using fabric SDK to communicate with fabric network. The BCS Gateway provides a HTTPS RESTful API to customers on the client side which allows clients/client applications to interact with elements of the fabric of the BCS.

Figure 2:
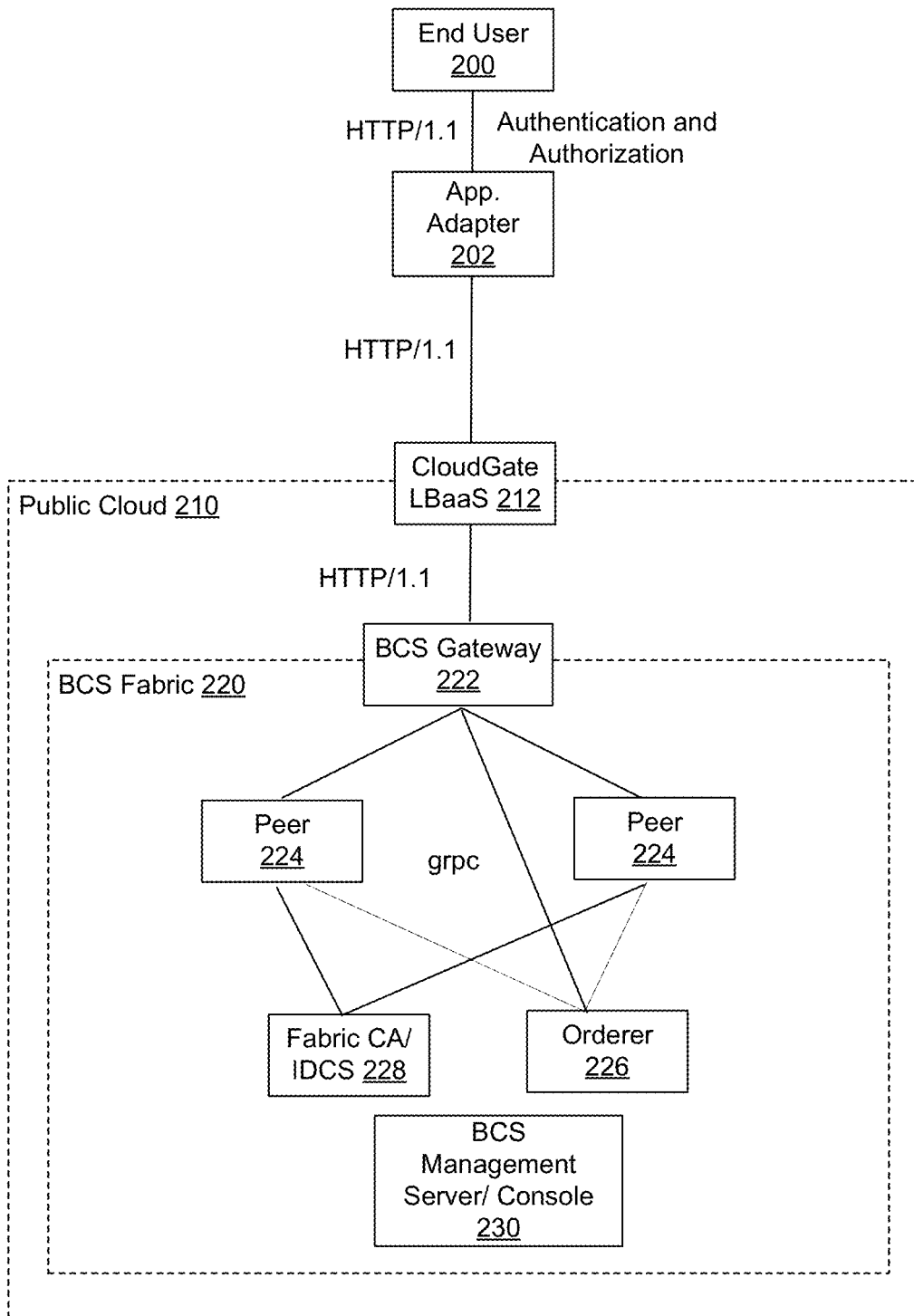
FIG. 2 illustrates a gateway for a Blockchain cloud service system in accordance with an embodiment.

FIG. 2 illustrates a gateway for a Blockchain Cloud Service system in accordance with an embodiment. As shown in FIG. 2, End User 200 interacts with an application adapter 202 for authentication and authorization using HTTPS. The application adapter 202 accesses the Public Cloud 210 using HTTPS to a LBaaS, such as CloudGate 212 (i.e., a LBaaS). Load balancing as a service (LBaaS) is performed for incoming transactions. CloudGate 212 passes transactions to BCS gateway 222 using HTTPS. BCS gateway provides the interface to BCS fabric 220 in which communication utilizes gRPC remote procedure call protocol.

In accordance with an embodiment, CloudGate 212 is a reverse proxy "access enforcement module" or "policy enforcement point" that secures web browser and REST API resources using, for example, OAuth2 and OpenID Connect standards. IDCS uses CloudGate internally to secure its own administration UI and REST APIs (referred to as "IDCS Web Tier"). For other applications, Cloud Gate: OTD is deployed as additional instances in a semi-supported/interim setup known as Non-IDCS or Standalone.

In accordance with an embodiment, the OAuth/OpenID based authentication supports user browser flow (for UI client) which is triggered if the HTTP request contains a "user-agent" header, which means the request is from a UI like browser or mobile app. CloudGate prompts the user for credentials (username/password), verifies the credentials, then creates and returns the OAuth session cookie which can be used by the subsequent HTTP requests from the browser. The OAuth/OpenID based authentication also supports Resource Server flow (for programmatic client). This flow is triggered if the HTTP request contains an Authentication "Bearer" token header. CloudGate validates the token for authentication.

In accordance with an embodiment, for HTTP basic authentication, for every HTTP request, the credentials (username/password) must be included in the HTTP Authorization "Basic" header. Cloud Gate verifies the credentials for every HTTP request. This method applies to both UI client and programmatic client.

In accordance with an embodiment, multitoken flow is a self-adaptive method which covers certain HTTP requests. If the HTTP request contains an Authorization "Basic" header, CloudGate performs HTTP basic behavior. If the HTTP request contains an Authorization "Bearer" header, Cloud Gate behaves the same as the resource server flow.

In an embodiment, the BCS console browser client utilizes the user browser flow. In embodiments, for BCS console and gateway programmatic client, the system can use CloudGate multitoken authentication method. Programmatic clients can invoke BCS REST APIs via HTTP basic authentication.

In accordance with an embodiment, BCS gateway 222 communicates with peers 224 which are network entities that maintain a ledger and run chaincode containers in order to perform read/write operations to the ledger. Peers are owned and maintained by members. BCS gateway 222 and peers 224 communicate with orderer(s) 226. Orderers provide ordering services. The Orderers are a defined collective of nodes that orders transactions into a block. The ordering service exists independent of the peer processes and orders transactions on a first-come-first-serve basis for all channel's on the network. Peers 224 and orderers(s) 226 communicate with the fabric certificate authority 228. BCS gateway 222 also provides access to BCS Management Server/Console 230.

In accordance with an embodiment, the BCS is deployed on a cloud system, such as ORACLE cloud. A gateway can be run in a container runtime service container. The gateway is stateless. A gateway can be updated by killing the old gateway and starting a new gateway. BCS gateway can allow customer queries or invoke fabric chaincode by RESTful protocol. BCS gateway allows client to access the fabric network in ORACLE cloud by HTTPS/RESTful service. The BCS Gateway is a network node using fabric SDK to communicate with fabric network. Communication within the fabric uses gRPC as a communication protocol. On the client-side, the BCS gateway provides HTTPS/RESTful API to customer. The REST API allows client to invoke functions within the fabric using the fabric SDK.

In accordance with an embodiment, a gateway can be provided in a one-to-one relationship with a fabric user. All gateway users belong to one organization, all gateway users map to one fabric user in one gateway. One gateway configured only one fabric user.

In accordance with an embodiment, IDCS issues gateway certification and gateway user ("App adapter") certification. These certifications are signed with organization CA. Gateway and gateway users can deploy with organization CA, so they could validate each other using HTTPS.

In accordance with an embodiment, each end user access BCSGW through "App adapter". There are 3-tiers of authentication. End user 200 can be authenticated by App adapter 202. App adapter 202 can be authenticated by BCS gateway 222 with client certificate. BCS Gateway can authenticated by peers 224 and orderer 226 in fabric network 220.

In accordance with an embodiment, one container runs one tomcat server, deploys one BCS Gateway, mapping to one fabric user. Multiple App adapters could connect to one Gateway.

In accordance with an embodiment, different gateways can be associated with different fabric user. End users of App adapters that connect to one gateway can map to one fabric user.

In accordance with an embodiment, BCSGW run in ORACLE cloud, configuration is set by BCS console using JSON file. Admin user could publish part of peers, channels and chaincodes to Gateway. Admin user starts Gateway by console. The gateway does not refresh configuration after boot. Admin user can set endorsers for chaincodes. The policy is opaque to end users, Gateway does not check chaincode policy.

In accordance with an embodiment, BCSGW is started by BCS console. BCS console creates BCSGW configuration file and uses the BCSGW package to start a new gateway. Upon startup, a startup script checks the BCSGW configuration file, modifies a configuration file (e.g., a Tomcat configuration file) for Tomcat, then starts Tomcat. Tomcat starts a thread for BCSGW, the thread read configuration file, for each channel, it can start a channel object, and create connections with order, peers, event hubs. Different channel will have different connection to order/peer/event hubs. The event hub here is a second port of peer. Gateway connects to this port to get the result of transaction. Tomcat servlet container can listen and wait for client request. For chaincode query method, BCSGW send the request to all peers of the channel, and only use the first result. For chaincode invoke method, BCSGW send the request to all endorsers of the channel, if one of them return success, BCSGW send the transaction to all orderers of the channel.

In accordance with an embodiment, an Asynchronous API is supported. A peer can open two ports, one port if for event exchange. The gateway can connect to the event port of peer. Gateway only need connect to one event port for one channel. Normal client APIs are synchronous. A transaction may take a few seconds, client need wait for response. Send asynchronous events to client is not in V1 plan. Besides synchronous transaction API, Gateway provide asynchronous transaction API "asyncinvoke".

In an embodiment, the Asynchronous API can work in this manner. After checking the parameters of client request, Gateway will return transaction ID to client. The client can be aware that the transaction is started but not finished. Gateway will start a background thread to keep processing the transaction. The client can track unfinished transactions. The gateway can provide "transaction" API for client to query transaction status using transaction ID.

In accordance with an embodiment, a client login can be supported. The BCSGW can support HTTPS protocol, and not allow unsecure HTTP access. BCSGW uses certificates to trust app adapter or SALT. The app adapter can authenticate end users. Tomcat needs set to use HTTPS client certificate authentication. The keystore file include BCSGW cert and CA cert to validate the client is provided by BCS console. The BCS gateway provides a BCS Rest interface for client access.

Persistence—Storage Cloud

In accordance with an embodiment, HYPERLEDGER FABRIC has the blocks of the ledger being stored in the local file system and other runtime data, like block index, state of the world, history and ledger provider being stored in LevelDB, which is also stored in the local file system. In container runtime service, the container file system is ephemeral, meaning when the container is stopped and a new container is restarted on a new VM due to some hardware failure—the file system contents may be lost. Considering a situation where all containers are lost, then there is no way to recover ledger. So ledger data must be stored outside container runtime service containers. Because of this, a persistence solution is provisioned in the form of an object storage service for use by components of the HYPERLEDGER FABRIC described above.

In accordance with an embodiment, accordingly in the BCS, the persistence solution utilizes a Storage Cloud Service. E.g. ORACLE Storage Cloud Service. The ledger is backed-up to an Object Store. Ledger blocks written to container file system, but also backup to object storage. Index & World State are recorded using the container File System but may be recovered from the Storage Cloud Service if a container is restarted. ORACLE Storage Cloud is an Infrastructure as a Service (IaaS) product, which provides an enterprise-grade, large-scale, object storage solution for files and unstructured data.

Figure 3:
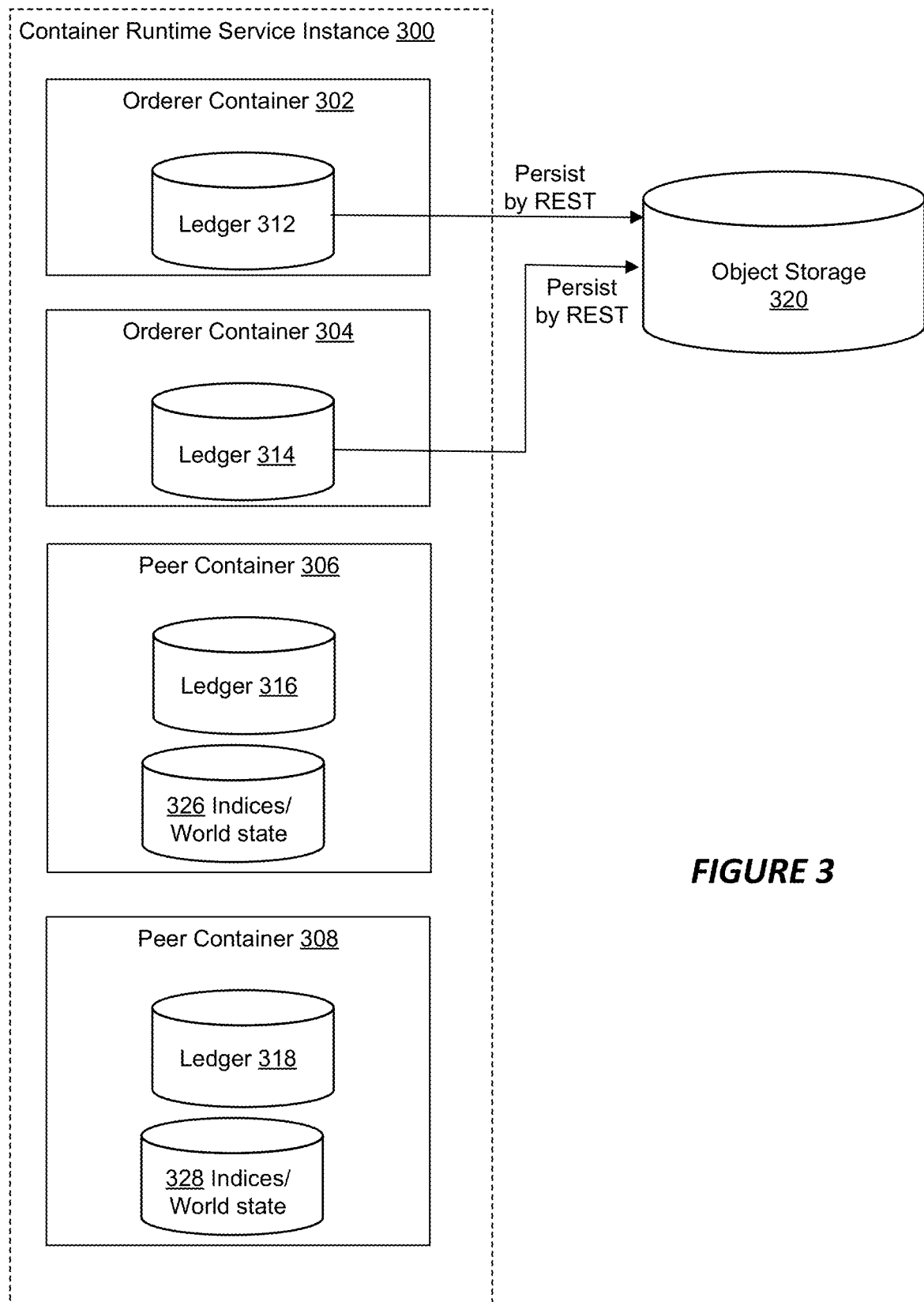
FIG. 3 illustrates a persistence for a Blockchain cloud service system in accordance with an embodiment.

FIG. 3 illustrates a persistence for a Blockchain cloud service system in accordance with an embodiment. As shown in FIG. 3, container runtime service instance 300 includes a plurality of containers. Containers include, for example ordering containers 302, 304 having ledgers/blockchains 312, 314. The ledgers/blockchains 312 and 314 are backed up over a REST interface to an Object storage 320. Object storage 320 may be, for example a cloud storage service.

In accordance with an embodiment, the object storage is used to persist the ledger of each orderer. The current mechanism for Orderer delivering blocks to Peer are as follows. First, a Peer delivers a request for new blocks from Orderer by sending its version (the last block number). next, an Orderer checks Peer's version, a) If it is greater than Orderer, returns an error to Peer, it indicates the ledger in Order are lost, and cannot be recovered from EventHub. In this scenario, Orderer cannot continue work properly. b) If Peer's version is less than Orderer, then Orderer retrieves blocks from local ledger, either in RAM or local file, and send back to Peer. c) If they have the same version, then Orderer blocks until new blocks are available. When a new block data cut from EventHub is ready, the Orderer will put it into local block file or RAM, then deliver thread reads this block from ledger and sends it back to Peer. Finally, the Peer gets this block, and commits it to local ledger. Next, the latest version of the ledger can be broadcast to other Peers.

In accordance with an embodiment, according to the above process, either Orderer or EventHub can have the whole blocks persisted. As described above, EventHub has time limited retention. If EventHub can do it, the Orderer can set Ledger type to RAM or file, once Orderer is restarted and ledger is lost, it can replay the records from EventHub and cut the batch message into block, then can re-construct ledger. If EventHub only supports a limited retention period, once Orderer is restarted and ledger is lost, it cannot re-construct ledger correctly because the first record in EventHub is not the true record in ledger. In this scenario, Orderer cannot start the old channel because the first block with channel information is lost, and version number (the last block number) is not correct as well.

In accordance with an embodiment, then, each orderer can persist each block to ORACLE Storage, meanwhile save all channel IDs to an object in Storage as well. On Peer, only persist the genesis block because it has the channel information. For other block data, Peer can retrieve it from Orderer once it is lost.

In accordance with an embodiment, container runtime service instance 300 can also comprise Peer Containers 306, 308 comprising ledgers 316, 318, and indices 326, 328. There are five types of runtime data generated by Peer: Transaction log (block file); Block file index (LevelDB); Ledger provider (LevelDB); State Database (LevelDB or couchdb); History (LevelDB). All transaction data are stored in Transaction log as a linked block in local file, it must be persisted to ORACLE Storage Cloud service. Ledger provider DB keeps all ledger ID and recover status in LevelDB. The ledger ID is the unique id to identify a channel that a peer belongs to. It must be persisted to ORACLE Storage Cloud Service. For others, Peer can recover it automatically at runtime, so keep them in local file system.

In accordance with an embodiment, ORACLE Storage Cloud Service provides REST API for uploading/downloading file to/from an object. When a new block is generated, first, it will be written into a local block file as before, the difference is one block per file. Next, this block file will be uploaded to ORACLE Storage as an object. If it fails, the changes in local file will be rollback, and an error will be returned to caller.

In accordance with an embodiment, for block file index, when Orderer updates a latest checkpoint, the information can be persisted to ORACLE Storage first, then update local LevelDB. If the event that the operation fails, an error can be returned to the caller. This information will be used for the recovery for block file index. In ORACLE Storage, each Peer and Orderer has unique container name that's the combination of msp id and node id. The object name is name of block file prefixed by channel name. For more details, see section Name Convention in ORACLE Storage.

In accordance with an embodiment, a save Ledger provider DB to ORACLE Storage option can be provided. For ledger provider DB, the entire LevelDB can be replicated to ORACLE Storage Cloud Service once it is updated. This file is very small, and the update is not frequent, so the overhead on the replication can be ignored. When container is restarted, it can be download it from ORACLE Storage Cloud Service if exists. If Orderer is restarted from a new container, it will download channel id from a Storage object first, then get latest checkpoint from Storage by channel id. Next, start recovery block index from the first block to last block. During this period, the block file will be downloaded one by one. After that, Orderer starts to recover State DB and History DB. If Peer is restarted from a new container, it will download Ledger Provider DB first, then it can get all ledger id. Next, get the related genesis block from Storage by ledger id. Peer starts with the configuration in genesis block and deliver a quest to Orderer to get other block data. After Peer gets these blocks, it starts to recovery block index, state and history DB.

In accordance with an embodiment, the local block file acts as a read cache. The query will read data from local first, if it doesn't exist, then download from object storage. Besides ledger, the source codes of chaincode need to be persisted to ORACLE Storage. In current fabric, an encoded source code will be stored on peer after chaincode is installed. Peer will check chaincode container for each Invoke or Instantiate, if the container doesn't exist, peer will rebuild it from source code. So, it can be upload it to ORACLE Storage for each chaincode installation, and download it when peer is restarted from disk failure.

BCS: SDK Based Configuration File Operations and Post-Provision Deployment

In accordance with an embodiment, configuration files and deployment functions deploy, initiate generate, update and get configurations about the applications include peers, orderers, CA servers and chaincode when deploy or update the applications. These functions reside at both BCS console (in Node.js) and fabric containers (peer/orderer/chaincode container). The functions will get/update configurations as requested from UI, and call SDK APIs to activate the configuration changes when needed. The component as part of BCS console backend interacts with the BCS console UI, IDCS backend SDK, and all the BCS applications to provide the SDK for UI operations get/update configurations as requested. The component also helps to provision the BCS applications. The BCS provision component will deploy the BCS applications into the Docker containers of the VMs created using PSM. This feature will implement SDK API for BCS console UI and BCS provision components get or update BCS applications configurations and deployment in post-provisioning phase. In the post-provisioning phase, the provisioning system will deploy BCS applications such as CA server, orderer, peer, under Docker/Swarm. When the VM startup, it will call startup script to perform post-provisioning and VM initial work.

In accordance with an embodiment, configuration files are provided for fabric components including peers, orderers, fabric CA and BCS Gateway. BCS applications packages, configurations, chaincode store in Customer's Storage Cloud Service.

In accordance with an embodiment, the provision system should complete all the resources allocation. The resources include VMs, Network, and Storage.

In accordance with an embodiment, the provision system should save all the resources allocation information to the storage service. The information includes the VM number and their network addresses/account credentials, BCS application number in each VM and their type, public and internal IP. And there should also be enough internal IP addresses (accessible among VMs) for containers.

In accordance with an embodiment, when the BCS provision component has done the provision work, the VM startup script will start, then call swarm deploy the container runtime service, and inside the container, the container startup.sh script to perform initiation operation.

In accordance with an embodiment, the BCS console will get the configurations from storage service when it starts, and will save the input of the user operation from UI back to storage service, and then send restart command to swarm.

In accordance with an embodiment, the security certificates needed can be saved in IDCS. Alternatively, the security certificates can be retrieved from IDCS.

In accordance with an embodiment, a BCS console backend can communicate with the BCS applications with swarm.

In accordance with an embodiment, when the BCS container runtime service starts up, the BCS application can gather configuration details to decide its application type (peer or chaincode container or other), and then load the configuration needed.

In accordance with an embodiment, this component updates the configuration and provides BCS application startup shell code. The BCS get/update configuration file operation can be split into several parts. First, the BCS console will get configuration from storage when it starts, and save configuration into storage from BCS console when need update (shell and Node.js). When the BCS container runtime service starts up, the startup script (in each Docker container) will start first then get configuration for its application type and get the app cert from IDCS (shell). When the BCS console UI restarts a BCS application, it sends message to the Docker/Swarm to restart the application in the container.

In accordance with an embodiment, the BCS console is stateless, and, when started, can gather all the BCS instance configurations and connects to the BCS applications and monitors them. The configurations will be obtained from a storage service via backend API. When any configurations change, the BCS console will call backend API to save the configurations back to storage service and restart related applications. When the customer changes the configuration items via BCS console UI, the UI will encode the configurations into key/value data, the backend code will transform it to file and save into the storage service. The BCS console can monitor, start and stop the BCS applications. The start and stop commands use Docker/Swarm APIs to implement this function.

Deployment of a Fabric Network

In accordance with an embodiment, a fabric network comprises the following entities: peers, clients, ordering service, and a set of protocols to facilitate the communications among these entities. Organizations are logical entities or corporations that constitute the stakeholders of a fabric network. A fabric network has multiple participating organizations. Member: A legally separate entity that owns a unique root certificate for the network. Network components such as peer nodes and application clients will be linked to a member. Each organization may have one or more members. One organization can contribute both orderers and peers, or orderers only, or peers only.

In accordance with an embodiment, a first step in deploying a fabric network is defining the participants. This step is done out-of-the-band of fabric network. All participating organizations of a fabric network negotiate and conclude the composition of the network including, for example, which organization(s) contribute orderer nodes, and which organizations contribute peer nodes. Every organization which contributes orderer nodes publishes the root certificate for its orderer servers. Every organization which contributes peer nodes publishes the root certificate for its peer servers. Every organization which has clients publishes the root certificate for its clients. Clients can be separated from peers to different members in one organization.

In accordance with an embodiment, as an example, four banks (bank1, bank2, bank3, and bank4) have decided to deploy a Blockchain network using an ordering service that would comprise orderer nodes owned by bank1 and bank2. And bank1 is only to contribute orderers in this network. Each bank is an organization of the fabric network: bank1 has 1 member: orderers(root_cert_1); bank2 has 3 members: clients(root_cert_21), peers(root_cert22), orders(root_cert23); bank3 has 2 members: clients(root_cert31), peers (root_cert32); bank4 has 2 members: clients(root_cert41), peers(root_cert42).

In accordance with an embodiment, after defining the participants, certificates are generated for orderers and peers. Each orderer or peer needs a (private key, signing certificate) pair to identify itself. Each member can configure and start its own fabric CA server with its root certificate, and use CLI or SDK to request the CA server to generate the (private key, signing certificate) for each orderer/peer server of this member. BCS provides a fabric CA server which can provide certificates. However, fabric CA server is not the only approach to generate certificates. User can use other CA system to do the same. So fabric CA server is not a mandatory component in a fabric network.

In accordance with an embodiment, after generating certificates for the orderers and peers, a fabric network is bootstrapped by creating the system channel. There is exactly one system channel for an ordering service (so for one fabric network), and it is the first channel to be created (or more accurately bootstrapped). The system channel defines the composition of a fabric network:

One Ordering service
    One or more Orderer organizations. Each org's
        MSP ID
        Certs
    Ordering service attributes (e.g. type—solo or Kafka, orderer addresses, batch size/timeout)
    Policies (who can create channels, etc.)
One or more Consortiums. Each consortium contains
    One or more peer organizations. Any peer organization which wants to participate in this fabric network must be defined here in one of the consortiums. Each org's
        MSP ID
        Certs
        Anchor peers In accordance with an embodiment, after a fabric network system channel is bootstrapped a genesis block is created for the system channel (first block in the chains). The Orderer service administrator generates the genesis block for the system channel. The genesis block can be generated either by tool configtxgen (genesismethod=file), or during orderer startup (genesismethod=provisional). When generating genesis block using the configtxgen tool, a configuration file configtx.yaml can be composed of the input. This file contains the following information: The root certificates of all orderer organizations in the fabric network; The root certificates of all peer organizations; Ordering service attributes: orderertype, address, batchtimeout, batchsize, kafka; Policies; Channel reader: authenticate & validate channel delivery requests; Channel writers: authenticate & validate channel broadcast requests; Chain creators: evaluate chain creation requests; Admins: authenticate & validate channel reconfiguration requests;

In accordance with an embodiment, the Orderer service administrator starts an orderer server with configuration file and the genesis block. This creates the system channel using the genesis block. A configuration file orderer.yaml is needed for starting an Orderer server: Listen address/port, ledgertype, etc.; LocalMSP (private key, signing certificate). Each organization which provides ordering service starts its orderer servers (no genesis block should be specified).

In accordance with an embodiment, each organization which contributes peer nodes prepares a configuration file (default location/etc/hyperledger/fabric/core.yaml) for each peer to specify: LocalMSP (private key, signing certificate) to identify the peer; and Peer attributes: Listen address/port, bootstrap peers, gossip attributes, etc. And then starts the peer servers.

In accordance with an embodiment, after the orderers and peers are started, the channel administrator (who has the privilege to create channel) uses fabric CLI or SDK to request an orderer to create a channel with the following input: One consortium (must have been defined in the system channel); and one or more Peer orgs in the consortium. Each participating organization uses fabric CLI or SDK to join some of its peers to the newly created channel.

Example: Deployment of a Fabric Network on BCS

Figure 4:
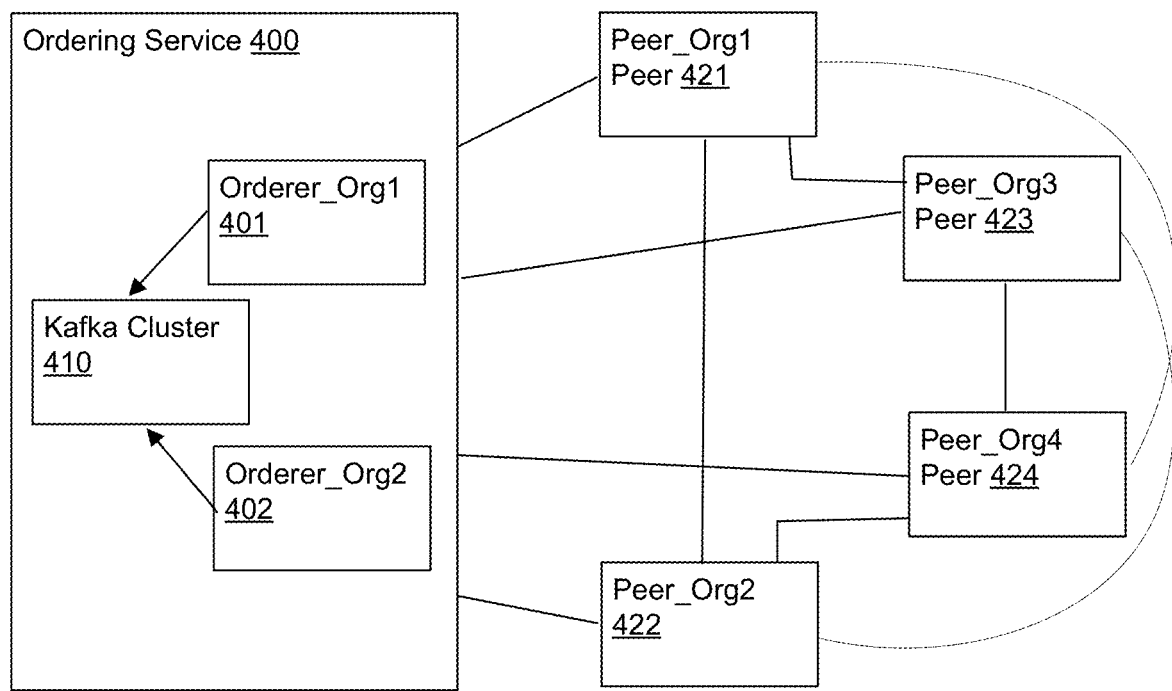
FIG. 4 illustrates an exemplary deployment of a fabric on BCS.

FIG. 4 illustrates an exemplary deployment of a fabric on BCS.

In accordance with an embodiment, more particularly, the figure and description describe the steps to deploy a fabric network on BCS. In this example, four entities A, B, C, and D want to create and join a fabric network. The four entities discuss off-line and decide responsibilities of the various entities. Each entity creates one or more BCS instance on OPC.

In accordance with an embodiment, Entity A provides both orderers and peers. Entity A creates two instances: Orderer_Org1 401 for orderers and Peer_Org1 421 for peers. Entity A is also responsible for creating the fabric network (note: only an orderer can create a fabric network). The ordering service 400 comprises Orderer_Org1 401 and Orderer_Org2 402 as well as Kafka cluster 410.

In accordance with an embodiment, Entity B provides both orderers and peers. Entity B creates two instances: Orderer_Org2 402 for orderers and Peer_Org2 422 for peers.

In accordance with an embodiment, Entity C provides only peers. Entity C creates instance Peer_Org3 423.

In accordance with an embodiment, Entity D provides only peers. Entity D creates instance Peer_Org4 424.

In accordance with an embodiment, the administrator of each BCS instance collects the CA certificate and admin certificate of the current org from BCS console. The administrator of each peer org identifies the anchor peers of the current org and collects the IP/port of the anchor peers. The four entities exchange all the collected information with each other off-line.

In accordance with an embodiment, from the BCS console, the administrator of Orderer_Org1 creates the fabric network by creating the system channel with the following information collected in previous step: the CA certificate and admin certificate of each org; and the anchor peers of each peer org. The backend work can comprise invoking a fabric tool to create genesis block and configuring orderer to create the system channel using the genesis block.

In accordance with an embodiment, from the BCS console, the administrator of each peer org joins the fabric network by updating the configuration of all peer nodes to add the CA/admin certificates of other orgs collected, and restarting all the peer nodes.

In accordance with an embodiment, in a system, a method is provided to allow a new org to join an existing fabric network. Furthermore, a user-friendly method can be provided to facilitate the communications among participants in order to create/join fabric network, e.g. to cover the off-line actions in preliminary to forming the fabric.

Chaincode (Smart Contract) Container

In accordance with an embodiment, and as discussed above chaincode is software defining an asset or assets, and the transaction instructions for modifying the asset(s). Chaincode enforces the rules for reading or altering key value pairs or other state database information. Chaincode functions execute against the ledger current state database and are initiated through a transaction proposal. Chaincode execution results in a set of key value writes (write set) that can be submitted to the network and applied to the ledger on all peers.

In accordance with an embodiment, to support the consistent update of information—and to enable a number of ledger functions (transacting, querying, etc.)—a blockchain network uses smart contracts to provide controlled access to the ledger. Smart contracts can encapsulate information, replicate it automatically across the fabric, and they can also be written to allow participants to execute certain aspects of transactions automatically.

In accordance with an embodiment, HYPERLEDGER FABRIC smart contracts are written in chaincode and are invoked by an application external to the blockchain when that application needs to interact with the ledger. In most cases chaincode only interacts with the database component of the ledger, the world state (querying it, for example), and not the transaction log.

In accordance with an embodiment, HYPERLEDGER FABRIC utilizes the Docker engine to build chaincode, deploy it and keep it running. This section describes the fabric architecture and how it is integrated into a container runtime service layered model for BCS.

In accordance with an embodiment, fabric deploys and manages user chaincode as follows: First build the chaincode in an ephemeral CC env container. Second, the chaincode is transferred as source code into the builder container, compiled with needed libraries statically linked ("JAVA build"), then the binary is sent back to the peer. The static link allows the actual chaincode container to be as small as possible. Third, build a chaincode image and container and start it. The chaincode container then remains running until the peer is shut down or the channel terminated. Should the chaincode container crash or be killed, if the image exists it is restarted on the next invocation. The design is to have one chaincode Docker container per peer and channel. Chaincode is explicitly installed on peers. That is: not all peers that join a channel necessarily have chaincode installed.

In accordance with an embodiment, users can deploy a fabric network in container runtime service layered containers, which have the ability to transparently distribute components such as peers, orderers and chaincode. Chaincode runtime environment containers (ccenv) will be dynamically started as ACLS containers Chaincode binary will be saved in Cloud Storage since local block storage is not considered a reliable way of recovering. Once built chaincode binaries will be uploaded to Cloud Storage for recovery purposes in case of container crash.

In accordance with an embodiment, each chaincode interaction can correspond to various functions of chaincode. The only restriction is that chaincode cannot be invoked or queried until it is instantiated. Additionally, upon any invocation the chaincode container is restarted if it cannot be found running.

Figure 5:
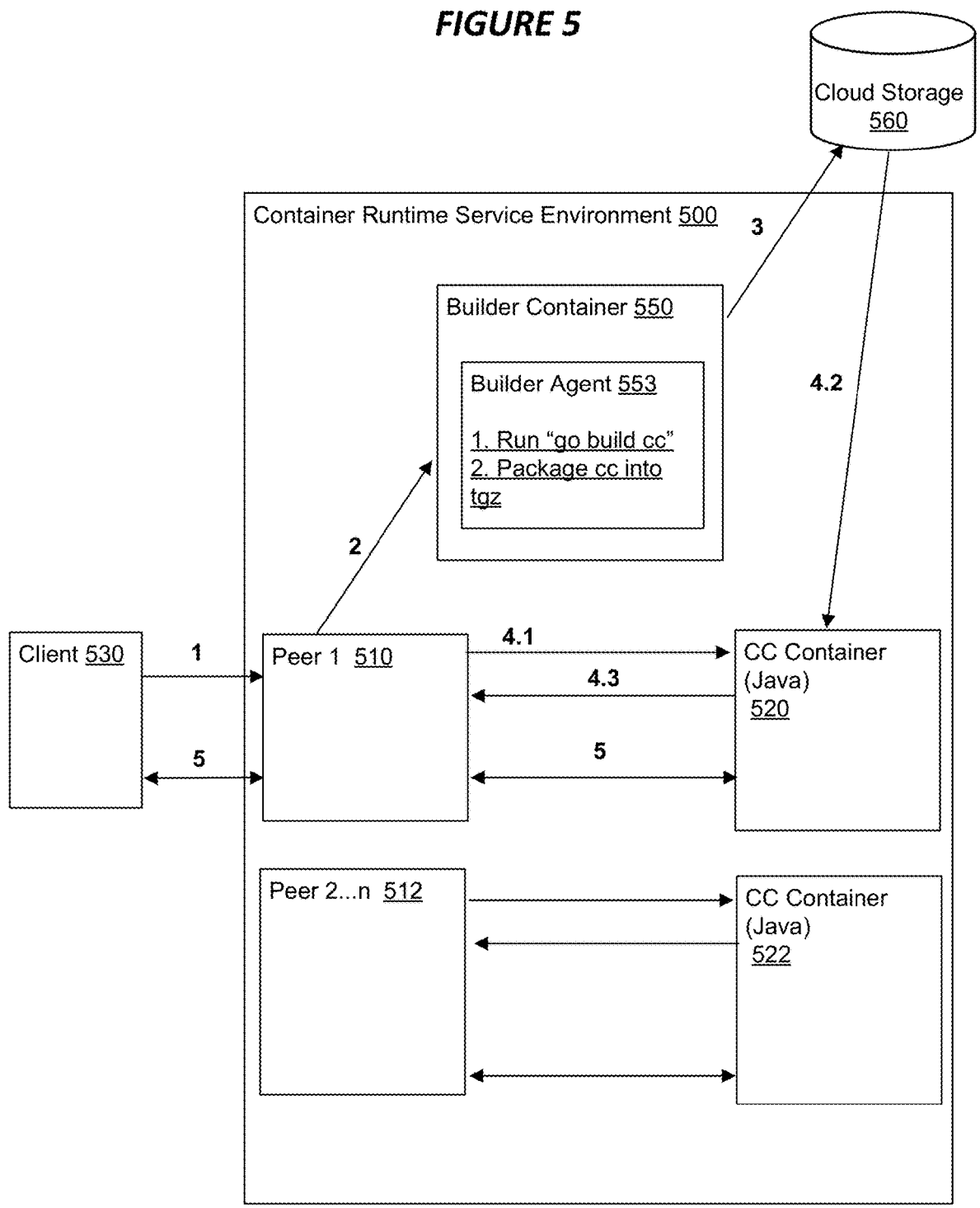
FIG. 5 illustrates a chaincode architecture, in accordance with an embodiment.

FIG. 5 illustrates a chaincode architecture, in accordance with an embodiment. More specifically, the figure illustrates a chaincode architecture which allows a client 530 to install chaincode and run transactions in container runtime service environment 500 according to an embodiment. Step 1, Client 530 installs chaincode source code to a Peer 1, 510. First build the chaincode in an ephemeral CC env container. When a client 530 performs "install", it will: start a builder container, which will automatically start a builder agent, wait for the builder container to finish initializing, send the chaincode source code to the builder container via peer, (step 2). The builder agent will build chaincode (JAVA build). The chaincode is transferred as source code into the builder container, compiled with needed libraries statically linked ("JAVA build"), then the binary is sent back to the peer. The static link allows the actual chaincode container to be as small as possible. Once built, the chaincode package (tgz file) will be uploaded to Cloud Storage 560 (step 3). The builder agent will send the Cloud Storage location to the peer for later reference (step 4.2).

In accordance with an embodiment, the peer 510 will then start the CC env as an ACLS (Access Control Lists) container 520, using the PSM REST API. Build a chaincode image and container and start it. The chaincode container then remains running until the peer is shut down or the channel terminated. The peer 510 will pass the chaincode ID, self IP (for chaincode registration) and Cloud Storage location to ACLS container start (step 4.1). The peer will wait for chaincode to start, or time out after a set period. The ccenv will start the chaincode. Upon startup, the chaincode will register itself with the peer step 4.3). The chaincode will be ready for invocation in transactions (step 5), which will be performed using the connection established at registration time.

In accordance with an embodiment, the builder container 550 comprises a simple REST-type server. The builder container 550 comprises builder agent 553. The builder container 550 starts up and listens for a chaincode build request. When the builder container 550 receives a build request, e.g.: POST call with base64 encoded source code as body it base64 decodes the source code and saves the chaincode source code in local filesystem. The builder agent 553 then performs "JAVA build" on the source code. If "JAVA build" is successful, the builder agent 553 package binaries and upload to Cloud Storage 560. The builder agent also returns the chaincode location to the peer. If "JAVA build" fails, the agent returns the error and reason to the peer.

BCS Management Console

In accordance with an embodiment, as described above, each instance of a BCS can include a management console, which can be used to manage and monitor the BCS instance, including the BCS Gateway, BCS nodes, and BCS channels.

In accordance with an embodiment, the management console component facilitate and automate the provisioning, monitoring and configuration of the BCS. The management console component can include a web application running in a script runtime environment, for example, Node.js. The web application can be built on a graphical user interface framework and a web framework; and can include a plurality of custom functions or APIs to communicate with various nodes or services in a BCS instance. The web application can populate information from the various nodes or services in the BCS instance into a view object, for display in a console user interface. The management console component can also provide a plurality of functions for an administrator to start, stop and update one or more nodes in a BCS instance. A set of management REST APIs can be provided by the script runtime environment or can be accessed by the script runtime environment, to support the same functions as provided by the web application.

In accordance with an embodiment, the system can facilitate the monitoring and management of the associated BCS instance through a web interface provided by the web application, or through a custom REST client application written using the set of management REST APIs.

In accordance with an embodiment, the management console can enable a BCS administrator to manage a plurality of components of the BCS instance, including one or more peer nodes, one or more orderer nodes, one or more fabric-CA nodes, one or more BCS gateway nodes, channels, and one or more chaincodes.

In accordance with an embodiment, managing a BCS component can include performing one or more of the following operations: starting the component, stopping the component, adding the component, removing the component, viewing/editing attributes of the component, viewing performance metrics of the component, and view logs of the component.

Figure 6:
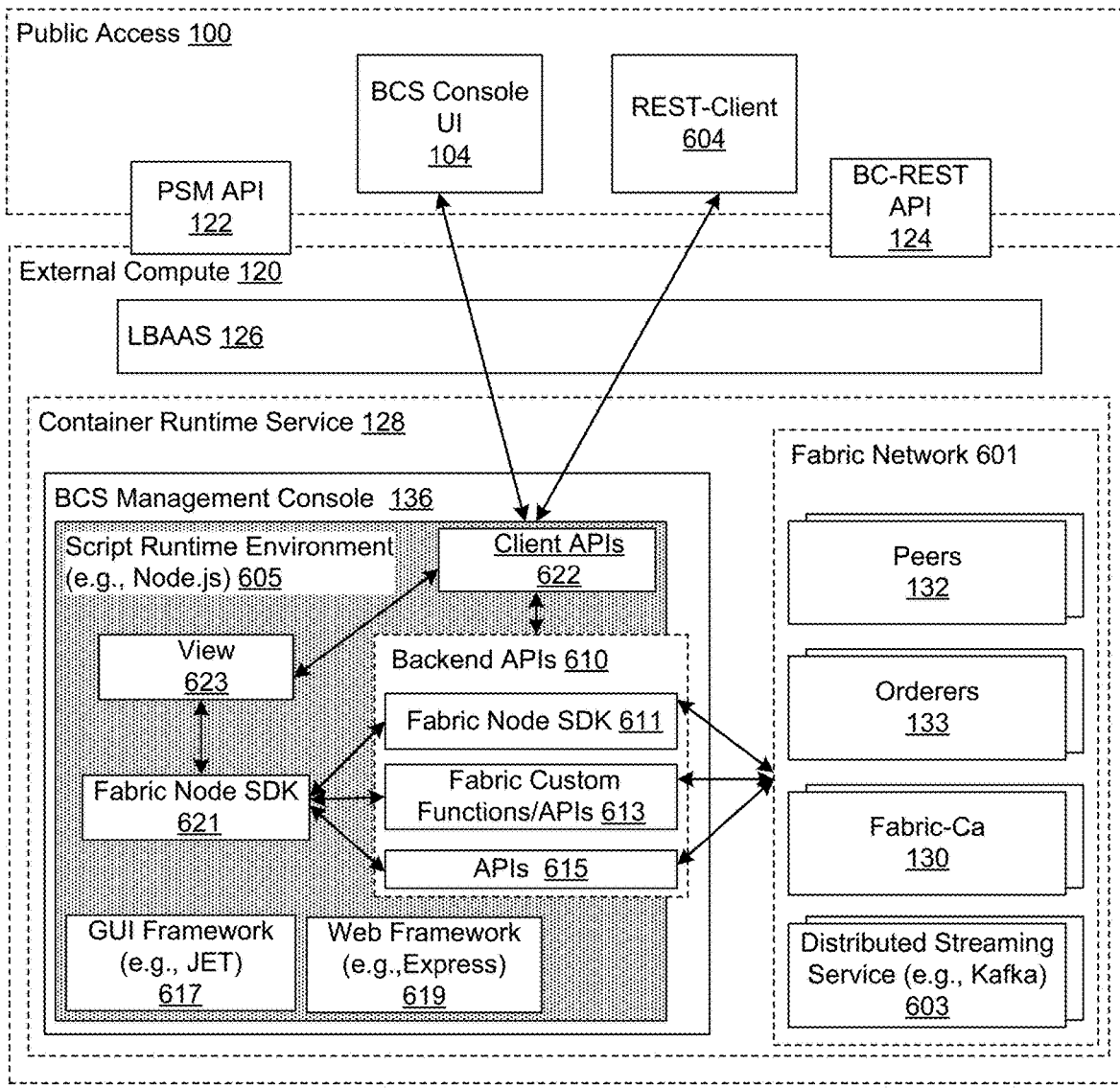
FIG. 6 illustrates a system for providing a management console in accordance with an embodiment.

FIG. 6 illustrates a system for providing a management console in accordance with an embodiment.

In accordance with an embodiment, as shown in the figure, a BCS management console 136 can be provided as a component of a BCS instance in the container runtime service 128. The BCS management console can be a web application running in a script runtime environment 605, which can represent a runtime environment provided by Node.js.

In accordance with an embodiment, the management console can include a plurality of backend APIs 610, for example, a fabric Node Service Development Kit (SDK) 611, a plurality of fabric custom functions/APIs 613, and a plurality of container runtime service APIs 615. The SDK, custom functions/APIs and container runtime service APIs can be used to communicate with a fabric network 601, which can comprise a distributed streaming service (e.g., Kafka) 603. The management console can further include a view object 623 that can contain information that needs to be displayed in the BCS console UI 104 or a REST-client 604, or contain information that needs to be passed from the BCS console UI or the REST-client to the management console. A fabric node SDK 621 can operate to map the information from the fabric network and the information the BCS console UI or the REST-client.

In accordance with an embodiment, the BCS management console can include a plurality of client APIs 622, which can be used by the BCS console UI or the REST-client to provision a BCS cloud service, and manage the provisioned BCS cloud service. Managing the provisioned BCS cloud service can include starting and stopping a peer node, an orderer node, a fabric-CA node, and a BCS gateway node; and adding and removing a peer node, an orderer node, and a BCS gateway node.

In accordance with an embodiment, the BCS management console can further include a GUI framework (e.g., JET) 617 and a web framework (e.g., Express) 619. The GUI framework can provide a variety of user interface (UI) components and elements that can be used in the management console web application. For example, the UI components and elements can be used to create forms, collect data, and visualize data. The web framework can be written in JAVASCRIPT and can provide a web application framework including a robust set of features to develop web and mobile applications.

Figure 7A:
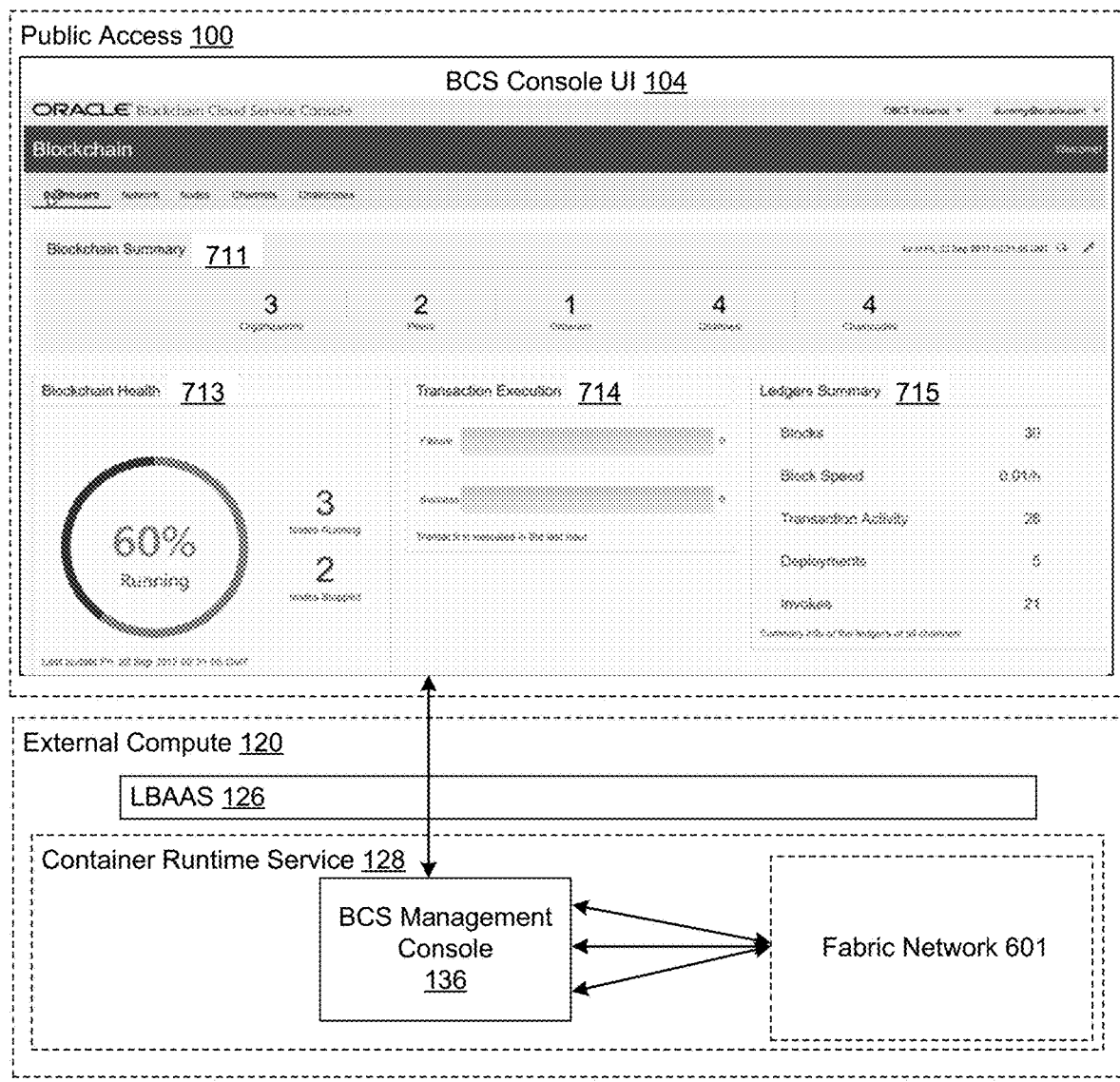
FIG. 7A illustrates examples of user interfaces in a BCS console UI in accordance with an embodiment.
Figure 7B:
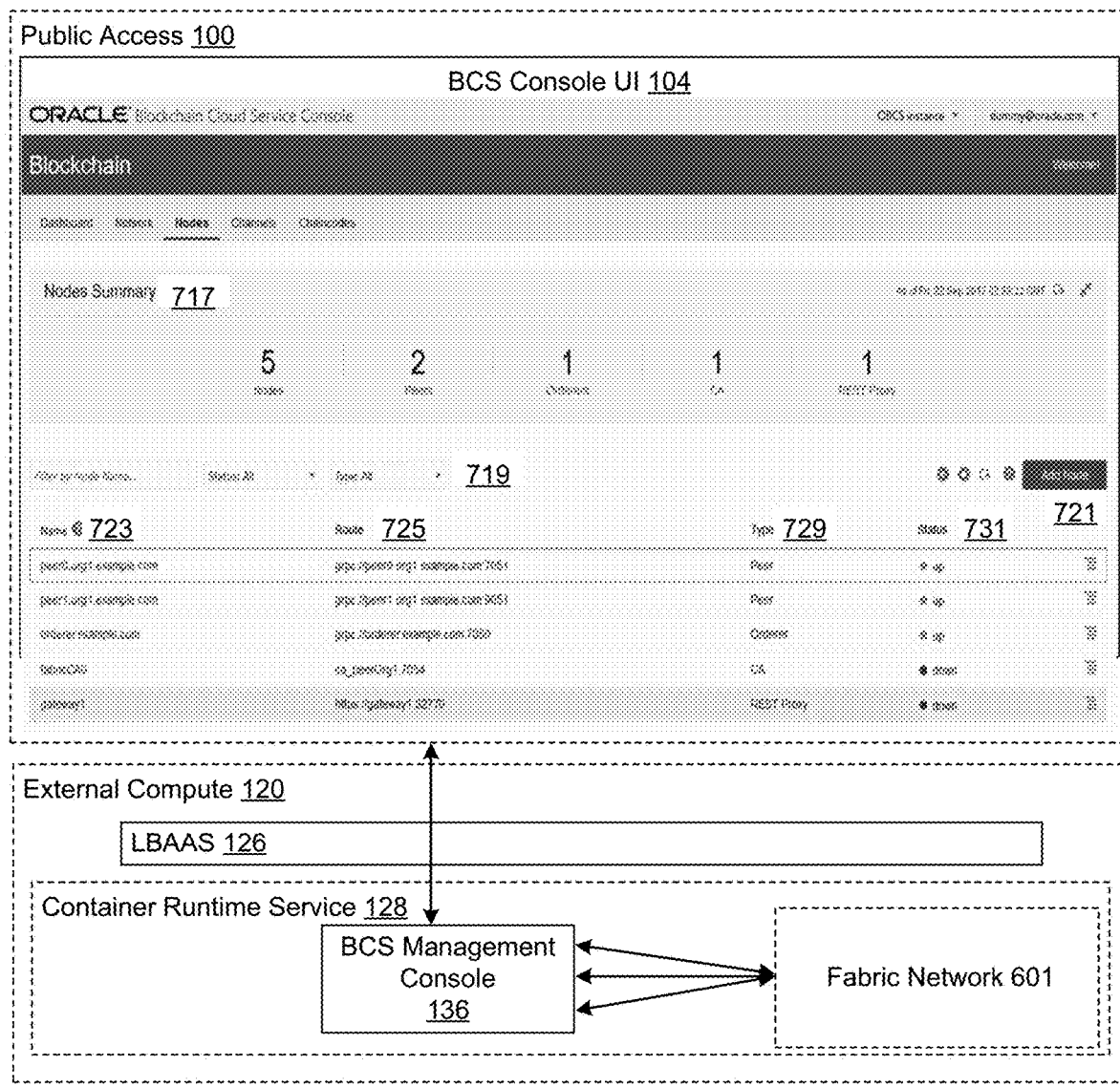
FIG. 7B illustrates examples of user interfaces in a BCS console UI in accordance with an embodiment.

FIGS. 7A-7B illustrate examples of user interfaces in a BCS console UI in accordance with an embodiment.

In accordance with an embodiment, as shown in FIG. 7A, a BCS summary 711 can be displayed in a dashboard. The summary can include the number of organizations, the number of peers, the number of orderers, the number of channels and the number of chaincodes.

In accordance with an embodiment, health information 713 of the BCS instance can be displayed. The health information can be visually displayed and numerally displayed. The sample UI can also display transaction execution 714 and ledges summary 715.

In accordance with an embodiment, FIG. 7B illustrates information for all the nodes in the BCS instance. For example, the sample UI shows a total of 5 nodes, including 2 peers, 1 order, 1 fabric-CA, and 1 REST proxy (within a BCS gateway node). For each node, the summary UI 717 displays the name of the node 723, the route information of the node 725, the type of the node 729, and the status information of the node 731. The sample UI include a button 721 for an administrator to add nodes, and one or more dropdown lists 719 to filter the nodes.

Node Management

In accordance with an embodiment, there can be two entities that can manage a BCS instance using the management console: BCS administrator and BCS user. There is only one BCS administrator account for each BCS instance. The BCS administrator account can be created when the BCS instance is created. The BCS administrator can be bundled with the fabric-CA administrator (i.e., all the actions that the BCS administrator performs from the BCS console or via BCS management REST APIs use the fabric-CA administrator identity). There can be more than one BCS user account, which can be created by BCS administrator by registering a fabric-CA identity.

In accordance with an embodiment, the nodes in a BCS instance can be displayed in one web page. The management console can support two modes. In the first mode, the name, type, access URL, and status of each node can be presented as a list. In the second mode, the channels that each peer participates in can be presented in diagram.

Further, in accordance with an embodiment, the management console can enable a BCS administrator to start and stop a peer node, an orderer node, a fabric-CA node, and a BCS gateway node; and add and remove a peer node, an orderer node, and a BCS gateway node. A fabric CA node cannot be added or removed.

In accordance with an embodiment, when adding a node, the BCS administrator can set the attributes of the node. The newly added node can be started automatically as part of the add operation. When a node is removed, the node is stopped and removed from the BCS instance.

In accordance with an embodiment, the BCS console UI can list all the channels that an active peer node participates in, and all the chaincodes that are installed on the active peer node.

In accordance with an embodiment, when managing peer nodes, the BCS administrator can join an active peer node to an existing channel, and view and edit the attributes of an active orderer node. A BCS user can view some of the attributes of an active peer node.

In accordance with an embodiment, further, snapshot performance metrics for an active peer node can be displayed in the BCS console UI, such as: memory usage, CPU percentage used, Network I/O, and Disk I/O.

In accordance with an embodiment, when managing orderer nodes, the BCS administrator can view the logs of an active orderer node, view and edit the attributes of an active orderer node. A BCS user can view some of the attributes of an active peer node. Similarly to managing a peer node, the BCS administrator can view the following snapshot performance metrics for an active orderer node: memory usage, CPU percentage used, Network I/O, and Disk I/O.

In accordance with an embodiment, when managing fabric CA nodes, the BCS administrator can view and edit the attributes of an active fabric CA node, get the CA certificate from the active fabric CA node, and view the logs of the active fabric CA node. Further, the BCS administrator can view the following performance metrics of the active fabric node: memory usage, CPU percentage used, Network I/O, and Disk I/O.

In accordance with an embodiment, as described above, managing a BCS gateway node can include adding or more removing a BCS gateway node. Since a maximum number of allowed BCS Gateway nodes is designated at the time a particular BCS instance is instantiated, the number of BCS gateway nodes that can be added to the BCs instance is limited by the configured maximum allowed number of BCS Gateways.

In accordance with an embodiment, each BCS gateway node can have a name, which is the globally unique identity of the gateway node. The name can be referred to in the future when the BCS gateway node is configured. The network address can also be determined and displayed when creating a BCS gateway node.

In accordance with an embodiment, when configuring a BCS gateway node, the BCS administrator can define a BCS gateway configuration file, and bootstrap the BCS gateway node. When a BCS instance is being provisioned, there may not be any channel created or chaincode deployed. As such, the BCS gateway node is not functional, until one or more chaincodes are deployed, and a valid BCS gateway configuration is defined through the management console.

In accordance with an embodiment, for each BCS gateway node, there can be a configuration page. Below items, in certain embodiments, can be configured in the configuration page:
1). Channels: Choose which channels to expose through the current gateway node.
2). Chaincodes: Chose which instantiated chaincode to expose from a list of all instantiated chaincodes in each channel.
3). Endorsers: For each chaincode, define the endorsing peers.
4). Generate the BCS gateway configuration according to the settings described above. Once a valid configuration file is generated for the BCS gateway, the gateway can be started.

In accordance with an embodiment, the BCS console allows a view of BCS gateway properties using a list view function. On the list view, below information is provided for each BCS gateway:
1). Name: the global unique name designated when the gateway is created.
2). Fabric identity name: Each BCS gateway can be associated with a fabric client identity, which is registered and enrolled when the BCS gateway is created. All the actions that the BCS gateway takes (e.g. invoke, query) can be entitled as this fabric client.
3). Network address: The accessing point with a public internet network address.
4). Status: Up or down.

In accordance with an embodiment, the management console also allow the BCS administrator to view the logs of an active BCS gateway node, and view the following BCS gateway metrics:
1). Connected clients: Client name, address, logon time, etc.
2). Current transaction information: current transaction information can be available along with state information, i.e. in what state this transaction is in. The current transaction information can be useful in debugging a hung transaction.
3). Transaction statistics: Transaction statistics can be available through the management console UI. For example, the transaction statistics can include the number of transactions completed, the number of event notifications received, and the number of event notifications delivered.
4). Memory usage.
5). CPU percentage.
6). Network I/O.
7). Disk I/O.

Channel Management

In accordance with an embodiment, a BCS user can list all channels that the current BCS instance participates in. The BCS administrator can create a channel with a channel name, a consortium name, and one or more organization names as inputs. Output can also be displayed to indicate the success or failure of the channel creation.

In accordance with an embodiment, a BCS user can view the participating nodes and organizations of a channel. The management console can support tow view modes: list mode and topology mode. In the list mode, the participating local nodes and external organizations (represented by its anchor peer) can be listed as a list. In the topology mode, the participating local nodes and external organizations (represented by its anchor peer) can be represented in a topology diagram.

In accordance with an embodiment, the BCS administrator can query the ledger of a peer in a channel. The ledger can comprise of a list of transaction blocks, each of which blocks can contain a block ID, a previous hash, a data hash, a timestamp, a transaction ID list, actions (1 . . . n), a chaincode ID, a chaincode proposal, a response (r/w set, events, success or failure), and one or more endorsers. The following statistics data can also be displayed: a number of blocks, and a number of invocations.

In accordance with an embodiment, the BCS administrator can list all the chaincodes instantiated in a channel. The listed items can include the chaincode ID and version. The BCS administrator can also view the following information of an instantiated chaincode: Path, which is the path as specified by the instantiated transaction; and instantiation arguments.

In accordance with an embodiment, the BCS administrator can upgrade an instantiated chaincode in a channel. The upgrade operation can take the following inputs: target endorsing peers with the new version of the chaincode installed; one or more orderers; chaincode version; and arguments, which optionally can be String array arguments specific to the chaincode. The output of the upgrade operation can be a success or a failure with error messages.

Chaincode Management

In accordance with an embodiment, the BCS administrator can list all the chaincodes installed on any peers of the current BCS instance. The listed item includes the chaincode ID and version. In addition, the BCS administrator can also view the following information of an installed chaincode: local peer nodes with the installed chaincode, and channels that have instantiated the chaincode.

In accordance with an embodiment, through the management console, the BCS administrator can install chaincode to one or more local peer nodes. The input for the installation operation can include: target peers; chaincode type, for example, golang/JAVA; chaincode ID which can be the name of the chaincode; chaincode version; chaincode path which can be the location of the source code of the chaincode; and chaincode package, which is optional. The output of the installation operation can be a success or a failure with an error message.

In accordance with an embodiment, the BCS administrator can instantiate an installed chaincode to a channel, with the following information as the inputs: channel name; target endorsing peers with the chaincode installed thereon; orderer; arguments which can be optional and can be String array arguments specific to the chaincode; and endorsement policy, with a defined format or a default format in the absence of a defined format.

Membership Management

In accordance with an embodiment, the BCS administrator can list all the identities in the current BCS instance, register a new user/identity for the current BCS instance, deregister an identity, and remove the user from the current BCS instance. Further, the BCS administrator can view/edit the following attributes of an identity, as shown in Table 1:

TABLE 1

| Attribute | Type | Access | Descriptions |
|---|---|---|---|
| Roles | Orderer, Peer, Application, User | R | R |
| Affiliation | BCS Administrator Smart-Contract Dev Smart-Contract User | R | The application roles of IDCS BCS application which is associated with the current user. |
| IsEnrolled | Boolean | R | R |

In accordance with an embodiment, the management console enable a BCS user can enroll or reenroll itself, which can generate a private key and certificate for the user. The management console also enable the BCS administrator to revoke an identity which was enrolled before, and enable a BCS user to change its password.

In accordance with an embodiment, the BCS management console can be started or stopped along with the start or stop of the associated BCS instance.

In accordance with an embodiment, there can be two ways to set the log level of the BCS management console: from the BCS management console itself, and use the management REST APIs to change the log level at runtime.

Figure 7C:
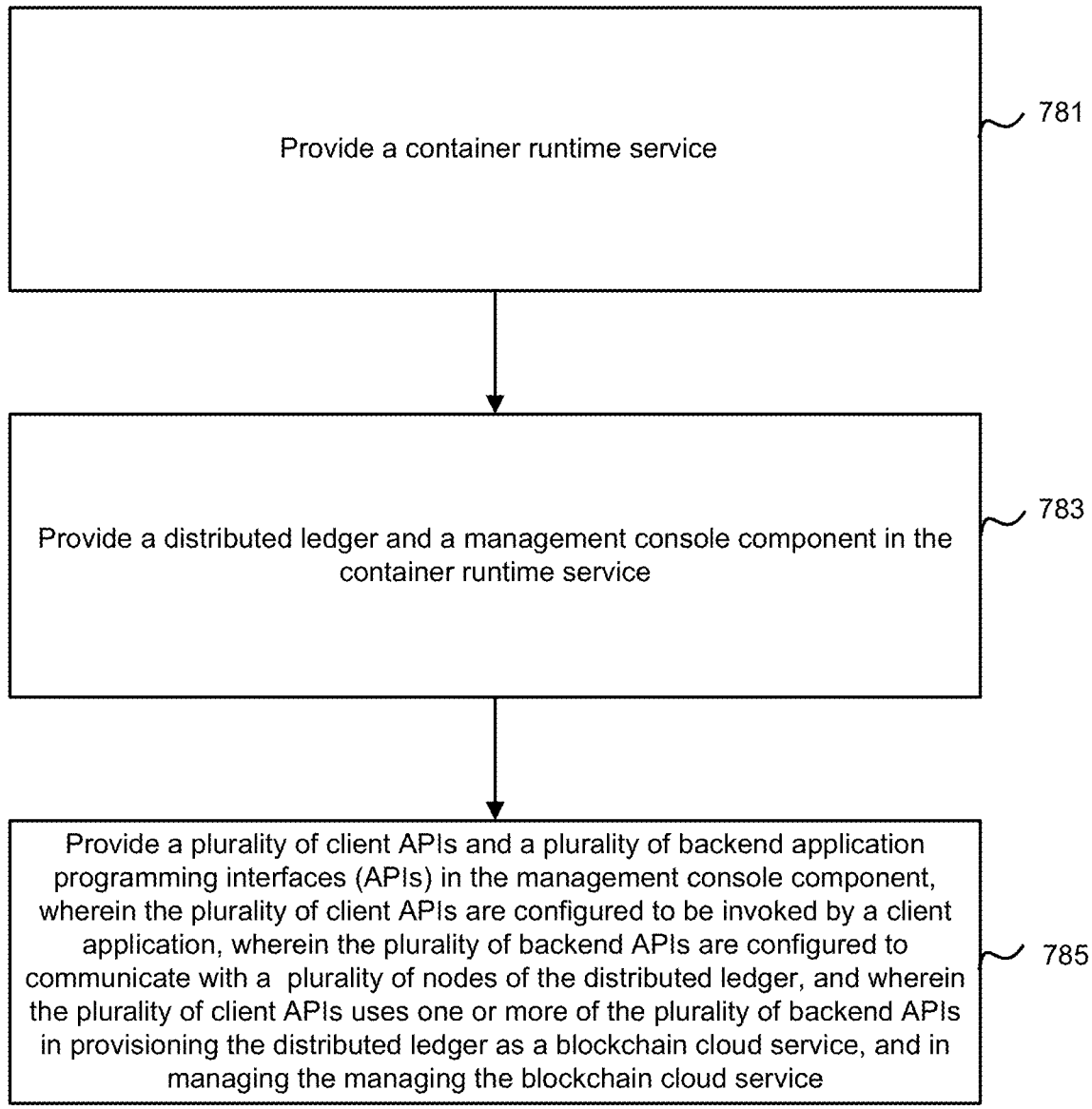
FIG. 7C illustrates a method for providing a management console in accordance with an embodiment.

FIG. 7C illustrates a method for providing a management console in accordance with an embodiment.

In accordance with an embodiment, as shown in FIG. 7C, at step 781, a container runtime service is provided.

In accordance with an embodiment, at step 783, a distributed ledger and a management console component are provided in the container runtime service.

In accordance with an embodiment, at step 785, a plurality of client application programming interfaces (APIs) and a plurality of backend APIs are provided in the management console component, wherein the plurality of client APIs are configured to be invoked by a client application, wherein the plurality of backend APIs are configured to communicate with a plurality of nodes of the distributed ledger, and wherein the plurality of client APIs uses one or more of the plurality of backend APIs in provisioning the distributed ledger as a blockchain cloud service, and in managing the blockchain cloud service.

REST Proxy Service

In accordance with an embodiment, as described above, communication among different components within a fabric network is based on gRPC protocol. As such, a BCS instance based on the fabric network would require a client application to use a fabric SDK to call a chaincode in the BCS instance.

In accordance with an embodiment, requiring a client application to use a fabric SDK to communicate with the blockchain cloud service can partially cancel out the benefits of providing a distributed ledger as a cloud service. For example, one of the benefits is that the cloud service should be accessed from anywhere with an internet connection.

In accordance with an embodiment, the REST proxy service component within the BCS instance can use a service development kit (SDK) for the distributed ledger in the BCS to communicate with the distributed ledger, and can provide REST APIs for use by client applications to query through chaincodes, synchronously or asynchronously invoke transactions through the chaincodes, get transaction statuses, and get BCS proxy versions. The REST proxy service component can authenticate REST calls, and translate the REST calls into remote procedural calls, e.g., GOOGLE Remote Procedure Calls (gRPC), for use in interfacing with the distributed ledger. The REST proxy service component can further provide REST APIs that support the same functions which are provided by the BCS management console component, and provide a user interface for client applications to consume the BCS instance.

In accordance with an embodiment, the REST proxy service component can be a network node in a distributed ledger that is implemented as a BCS, run in a container runtime service container in a cloud environment (e.g., ORACLE Cloud), and can be managed by a PaaS manager (e.g., ORACLE PaaS Service Manager (PSM) platform).

In accordance with an embodiment, the REST APIs provided by the REST proxy service component can include REST APIs that enable client applications to access smart contracts installed on the BCS, and administrative REST APIs for the management console component.

Figure 8A:
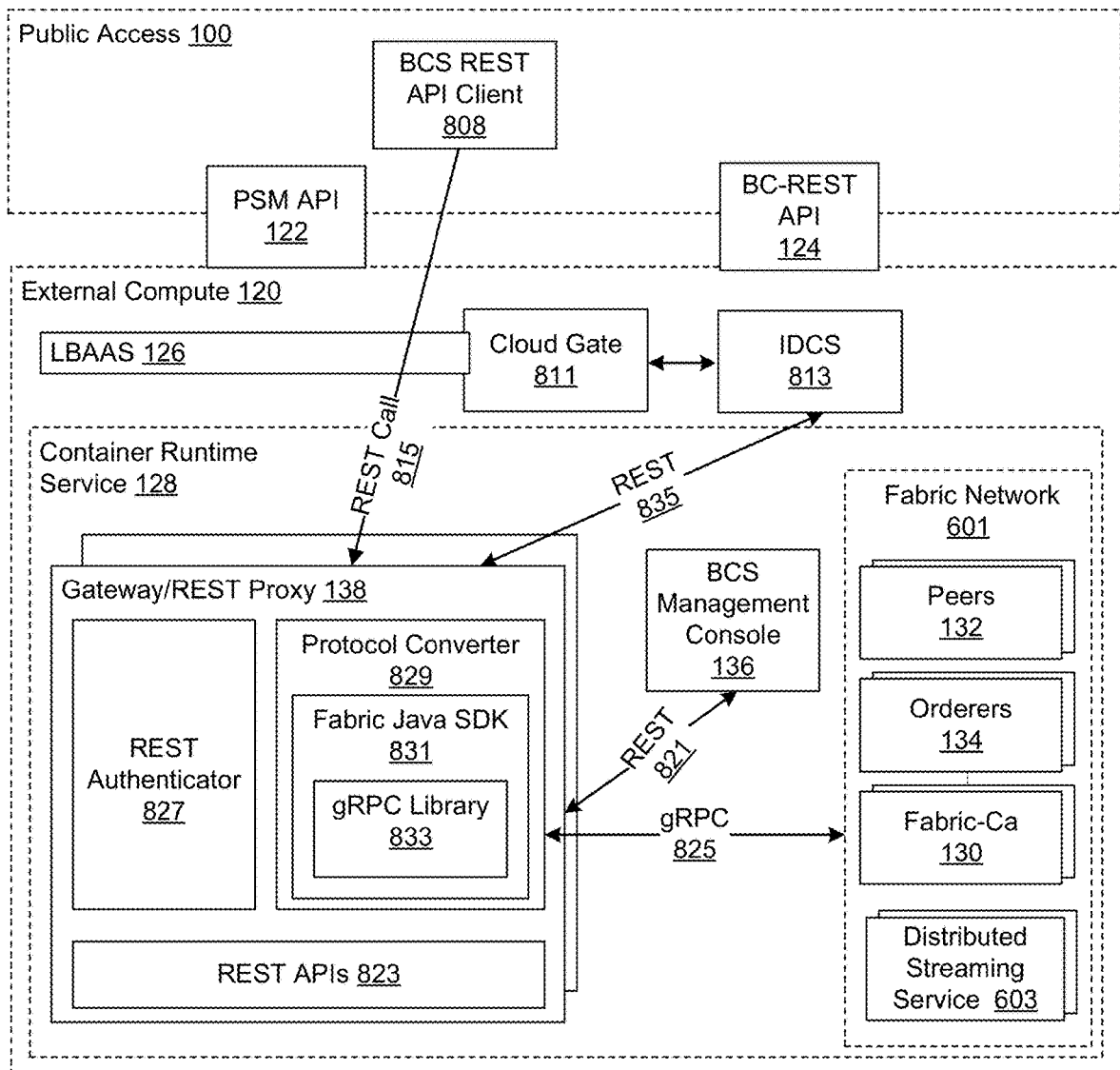
FIG. 8A illustrates a system for providing a REST proxy service in a BCS instance in accordance with an embodiment.

FIG. 8A illustrates a system for providing a REST proxy service in a BCS instance in accordance with an embodiment.

In accordance with an embodiment, as shown in FIG. 8, the REST proxy 138 can include a REST authenticator 827 and a protocol converter 829. When the BCS REST API client 808 sends a REST call 815 to the REST proxy, the LBaaS 126, which is connected to the cloud gate 811, can authenticate the call to determine whether the REST call include a valid user name and a valid password to allow the REST to access the BCS instance.

In accordance with an embodiment, if the REST call is authenticated by the LBaaS, the LBaaS can direct the REST call to the REST proxy, which can forward the REST call 835 to an IDCS 813 to determine whether the client application has been granted appropriate authorization with the BCS.

In accordance with an embodiment, if the client application is appropriately authorized, the REST proxy can translate/convert the REST call into a gRPC call 825, and send the GRPC call to the fabric network 601. The REST call, once transformed/translated to internal calls (gRPC), can interface with the instance of the blockchain fabric/Hyperledger.

In accordance with an embodiment, the REST call can be translated by the protocol convertor, which can be a JAVA application based on a fabric JAVA SDK 831 with a GRPC library 833.

In accordance with an embodiment, as further shown in FIG. 8, the REST proxy can communicate with the management console as described above using REST 821, to expose one or more functions provided by REST APIs 823 to the management console.

Figure 8B:
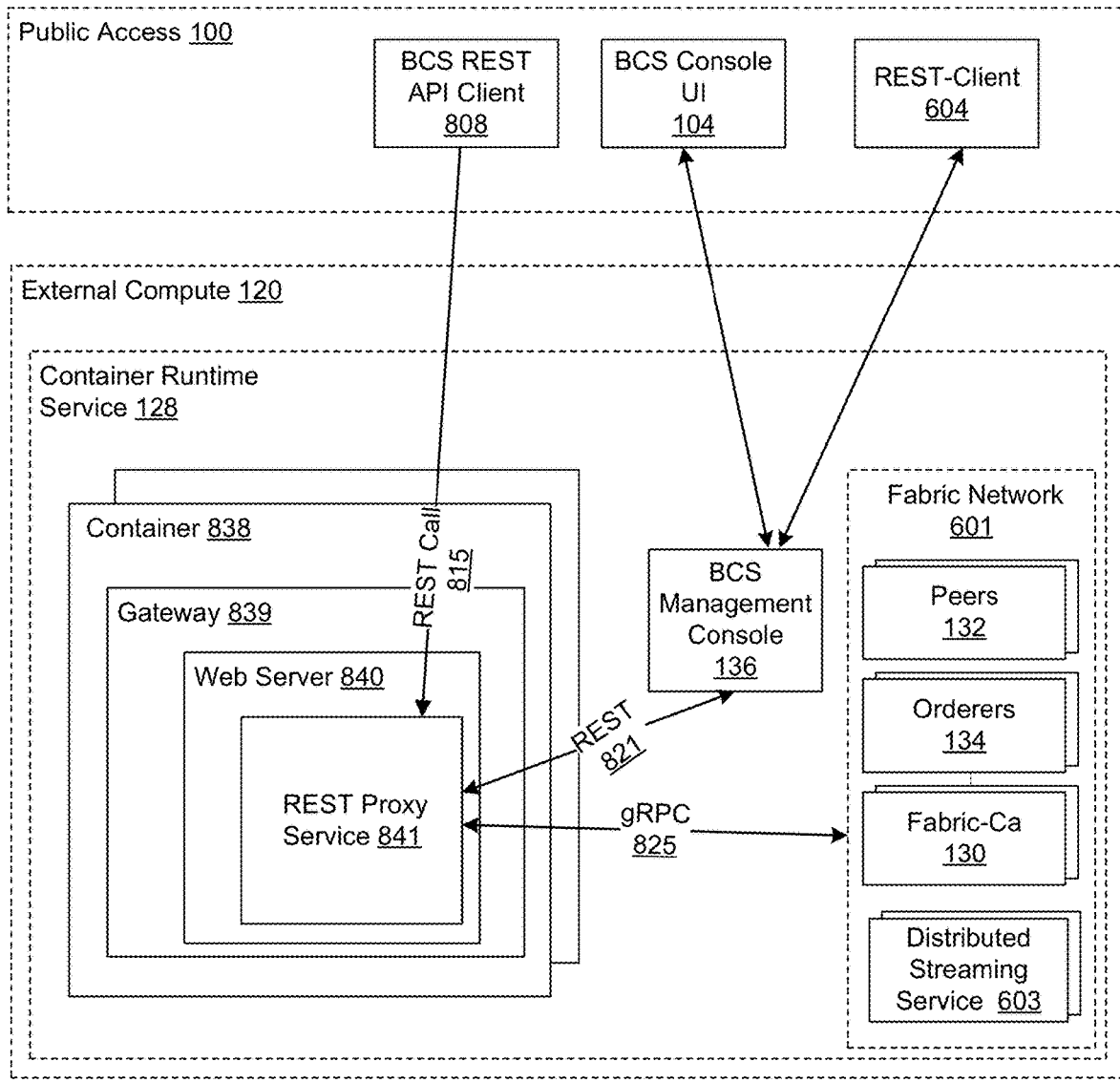
FIG. 8B illustrates a system for providing a REST proxy service in a BCS instance in accordance with an embodiment.

FIG. 8B illustrates a system for providing a REST proxy service in a BCS instance in accordance with an embodiment.

In accordance with an embodiment, as shown in FIG. 8B, the REST proxy service component 841 can run in a web server 840 (e.g., a tomcat server) in a container runtime service container 838, and can be mapped to a single fabric user. Further, the REST proxy service component can be configured through user interfaces provided by the management console component using JAVASCRIPT Object Notation (JSON) files, and can be started through user interfaces provided by the management console component. An administration user can publish part of peers, channels and chaincodes to the REST proxy service component. Any update to the configuration of the REST proxy service component can be automatically reloaded.

In accordance with an embodiment, the REST proxy service component (node) can be started by a BCS gateway. A startup script can check a configuration file of the BCS gateway, can modify a configuration file of a web server hosting the REST proxy service component, and then start the web server. The web server can start a thread for the BCS gateway to read a configuration file and create a channel object for each channel. For each channel, the web server can also create connections with orderers, peers, event hubs. Different channels can have different connections to orderers/peers/event hubs. An event hub can be a second port of a peer. The BCS gateway can connect to this port to get the result of a transaction.

In accordance with an embodiment, a servlet container in the web server can listen and wait for client requests. For query methods of a chaincode, the BCS gateway can send requests randomly to two endorsers of the chaincode, and only use the first result. For invoke methods of a chaincode, the BCS gateway can send requests to all endorsers of a channel, and if one of them returns success, the BCS gateway can send a transaction to all orderers of the channel. A peer can open two ports, with one port for event exchanges. The BCS gateway can connect to the event port of a peer for one channel.

In an embodiment, the REST proxy service component can support both asynchronous APIs and synchronous APIs.

In accordance with an embodiment, for asynchronous APIs, the REST proxy service component can check parameters of a request from a client, and return a transaction ID to the client, which can receive information indicating that the transaction has started, but has not finished. The REST proxy service component can start a background thread to keep processing the transaction. The client can track unfinished transactions. The REST proxy service component provide transaction APIs for the client to query transaction statuses using transaction IDs.

Figure 8C:
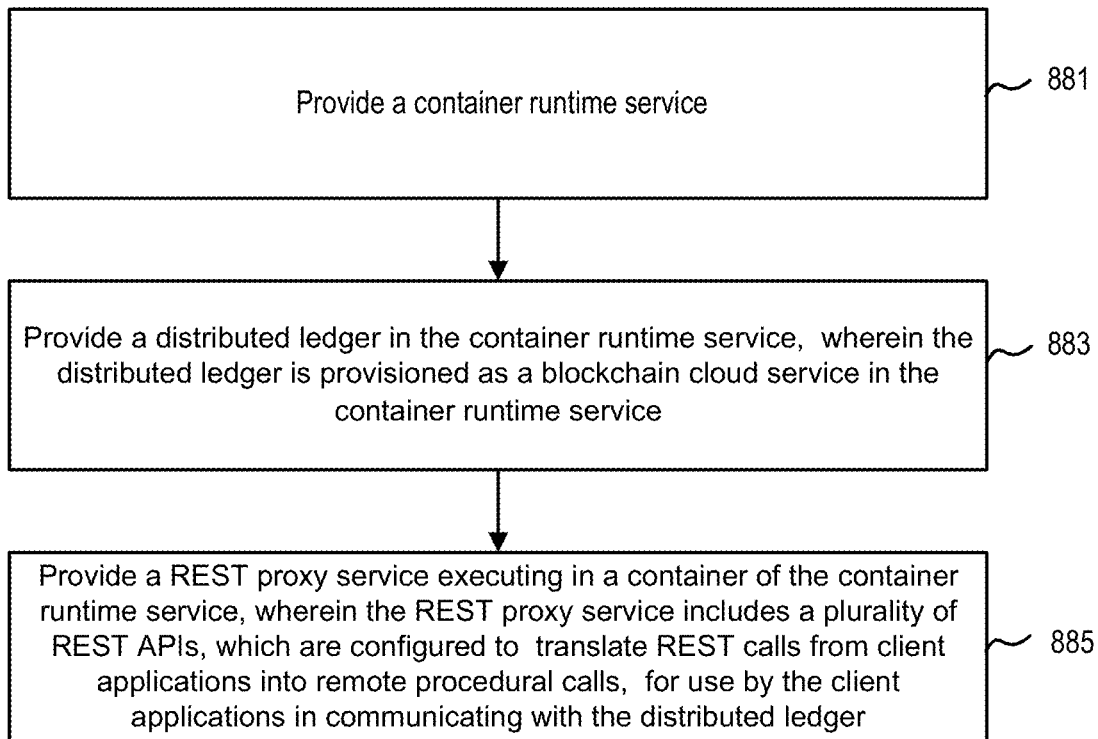
FIG. 8C illustrates a method for providing a REST proxy service in a BCS instance in accordance with an embodiment.

FIG. 8C illustrates a method for providing a REST proxy service in a BCS instance in accordance with an embodiment.

In accordance with an embodiment, as shown by FIG. 8C, at step 881, a container runtime service is provided.

In accordance with an embodiment, at step 883, a distributed ledger is provided in the container runtime service, wherein the distributed ledger is provisioned as a blockchain cloud service in the container runtime service.

In accordance with an embodiment, at step 885, a REST proxy service executes in a container of the container runtime service, wherein the REST proxy service includes a plurality of REST APIs, which are configured to translate REST calls from client applications into remote procedural calls, for use by the client applications in communicating with the distributed ledger.

Example REST APIs

In accordance with an embodiment, the REST proxy service component can provide REST APIs for interactions between client applications using a BCS and smart contracts (chaincodes) installed on the BCS. The following REST APIs are provided as examples to illustrate the functionality of the REST proxy service component of a blockchain cloud service.

In accordance with an embodiment, before invoking the REST APIs, the REST proxy service component needs to be up and running. The status of the REST proxy service component can be check through the management console. If the REST proxy service component is not up and running, it can be started from the management console.

In accordance with an embodiment, the REST APIs can be invoked to interact with smart contracts (chaincode) deployed on peer nodes in a BCS instance. The deployment process can be accomplished through the chaincode page of the management console. The deployment consists of two steps: installation (copy to peers), and instantiation (compiling, binding to a channel, and initializing).

In accordance with an embodiment, the example REST APIs provided below assume the following example chaincodes are deployed to the BCS.

TABLE 2

| Function Name | Input Parameters | Function Description |
| --- | --- | --- |
| funcquery | Args[0]: account A | This function is to query the information for the specified account A, and then returns the account information. |
| funcinvoke | Args[0]: account A<br>Args[1]: account B<br>Args[2]: amount of money C | This function performs a transaction, which moves amount of money C from account A to account B. |

TABLE 3

| Channel | Chaincode | Chaincode Version |
| --- | --- | --- |
| ChannelXYZ | MyChaincode | 1.0 |

In accordance with an embodiment, as shown above, Table 2 illustrates example functions of a chaincode, and Table 3 illustrates an example installation of the chaincode.

In accordance with an embodiment, the REST proxy service component can provide REST APIs to for querying through chaincodes, invoking transactions through chaincodes, asynchronously invoking transactions through chaincodes, obtaining transaction statuses, and getting versions of a BCS gateway.

In accordance with an embodiment, the API for querying through chaincodes can invoke the chaincodes to perform query actions, with chaincode and arguments for the query specified through the REST API. The API for obtaining transaction statuses can query a channel for transaction statuses, with the channel and a transaction ID specified through the REST API. The APIs for getting versions of a BCS gateway can return the version information of the BCS gateway. The API for invoking transactions through chaincodes can invoke the chaincodes to perform transaction actions, with the chaincodes and arguments for invocation specified through the REST API. This REST API can perform the transactions in a synchronous mode, which means a response is sent back in any of the following three cases: The transaction is done successfully; the transaction fails be done; the transaction time outs.

In accordance with an embodiment, the API for asynchronously invoking transactions through chaincodes can invoke the chaincodes to perform transaction actions, with the chaincodes and arguments for invocation specified through the REST API. This REST API performs the transactions in asynchronous mode, which means a response/acknowledgement is sent back immediately after the transaction is submitted without waiting for the complete or timeout of it. Results may then be provided subsequently.

In accordance with an embodiment, a set of administration REST APIs can be provided on the REST proxy service component, for invocation by the management console to provision and/or manage the BCS.

Invoke Query

In accordance with an embodiment, a chaincode may contain more or more functions which are used for querying information. These functions can be invoked through the following REST API by submitting a POST request on the REST resource using cURL: curl -H Content-type:application/json -X POST http://localhost:8080/bcsgw/rest/v1/transaction/query.

In accordance with an embodiment, the request body in JSON of the invoke query can be illustrated below:

```
{
"channel": "ChannelXYZ",
"chaincode": "MyChaincode",
"chaincodeVer": "1.0",
"method":" funcquery", "args":["a"]
}
```

In this example, the function named funcquery has the input parameter Args[0]: account A. This function can query the information for account A and return the account information, including chaincode name, chaincode version, method defined in the chaincode to invoke a query, and an array containing arguments that are passed to a specified method in the chaincode.

An example response header for the invoke query can be illustrated below:
HTTP/1.1 200
Content-Type: application/json Content-Length: 53
Date: Mon, 10 Jul. 2017 01:26:25 GMT An example response body for the invoke query can be illustrated below:

```
{
"returnCode": "Success",
"result": "100",
"info":null
}
```

In the above example response body, "Success" for the "returnCode" means the query completed successfully, and a "Failure" would mean the query has failed. For "result", when the returnCode is "Success", a string with the query result can be returned. For "info", when the returnCode is "Failure", a string with additional details of the failure can be returned.

Invoke Transaction (Synchronous)

In accordance with an embodiment, a chaincode may contain one or more functions for transactions. This REST API is used to invoke these transactions. The response can be sent back when any of the following conditions are satisfied: Time out for the operation, Success of the transaction, and Failure of the transaction.

In accordance with an embodiment, a cURL command "curl -H Content-type:application/json -X POST-d http://localhost:8080/bcsgw/rest/v1/transaction/invocation" can be used to invoke this REST API.

An example request body in JSON can be illustrated below:

```
{
"channel": "ChannelXYZ",
"chaincode": "MyChaincode",
"chaincodeVer": "1.0",
"method": "funcinvoke", |
"args": ["a","b","3"]
}
```

In this example, the function named funcinvoke has the input parameters Args[0]: account A, Args[1]: account B, and Args[2]: amount of money C. This function will move 3 from account a to account b.

An example response header can be illustrated below:
HTTP/1.1 200
Content-Type: application/json Content-Length: 119
Date: Mon, 10 Jul. 2017 01:26:25 GMT An example response body can be illustrated below:

```
{
"returnCode": "Success",
"info":null
"transactionID":
"e82a8a0969c38292f273278d5a6bfe4a257630538df2ebc28ca9b9cc17077"
}
```

Invoke Transaction (Asynchronous)

In accordance with an embodiment, a chaincode may contain one or more functions for transactions. This REST API or operation can be used to invoke those functions in asynchronous mode, where the transaction ID is returned immediately even if the operation has not yet completed, failed, or timed out. When using this operation, the status of the operation is queried separately.

The API can be invoked using the command "curl -H Content-type:application/json -X POST-d http://localhost:8080/bcsgw/rest/v1/transaction/asyncInvocation."

An example request body in JSON can be illustrated below:

```
{
"channel": "ChannelXYZ",
"chaincode": "MyChaincode",
"chaincodeVer": "1.0",
"method":" funcinvoke",
"args":["b","a","5"]
}
```

In this example, the function named funcinvoke has the input parameters Args[0]: account A, Args[1]: account B, and Args[2]: amount of money C. This function will move 5 from account b to account a. This REST API operation always returns a transaction ID immediately after the transaction is submitted. The status for the transaction can be queried by another REST API operation.

An example response header can be illustrated below:
HTTP/1.1 200
Content-Type: application/json Content-Length: 119
Date: Mon, 10 Jul. 2017 01:26:25 GMT An example response body can be illustrated below:

```
{
"returnCode": Success",
"info": null
"transactionID":
```

-continued

```
bf8536c89ae44f65ac3f9fd64871ed76be0e9cb986213cfa75f9e54fb2f1af"
}
```

In the above response body, a "Success" for the "returnCode" means the transaction was invoked successfully, a "Failure" means the transaction failed to be invoked. When the returnCode is "Failure", the "info" can contain additional information about the failure.

View Status of a Specified Transaction

In accordance with an embodiment, with this REST API, a user can check a transaction's current status by specified channel information and a transaction ID. This REST API can immediately return the transaction's current status.

The cURL command "curl -H Content-type:application/json -X POST -d http://localhost:8080/bcsgw/rest/v1/transaction" can be used to invoke the API.

The following is the header of an example request in JSON for invoking the API. In the header, "txid" is the transaction ID.

/bcsgw/rest/v1/channel/transaction?channel=
ChannelXYZ&txid=42bdbc5917593da3bcd658969
5a24f6bb786ebd3dd264a0b52a243348defa954 HTTP/
1.1 User-Agent: curl/7.29.0 Host: localhost:8080
Accept: */*

The following is the header of an example response:
HTTP/1.1 200
Content-Type: application/json Content-Length: 53
Date: Mon, 10 Jul. 2017 01:26:25 GMT
The following is the body of an example response:

```
{
"returnCode": "Success",
"result":        "100",
"info": null
}
```

View Status for a Transaction List

In accordance with an embodiment, this REST API can be used to check the status of a group of specified transactions. This REST API returns when either one of the following two conditions are true: 1). No transactions have InProgress status. That is, all transactions listed have completed successfully or failed; 2). timeout has been reached for this request.

The command "curl -H Content-type:application/json -X POST -d http://localhost:8080/bcsgw/rest/v1/transaction/waitStatus" can be used to invoke the REST API.

The following is an example request body in JSON:

```
{
"timeout": 10000,
"array": [
    {
        "channel": "ChannelXYZ",
        "txid": "245575b55fe15120e42e6a7a389cfe33e5ace9102da4e15cb18cc"
    },
    {
        "channel": "ChannelXYZ",
        "txid": "786255b78932a7e874232d243241223c2e6a7a389b55fe1502da4e15c "
    }
]
}
```

The above request checks statuses of the transactions specified by the listed channels and transaction IDs. "timeout" specify a timeout for this operation in milliseconds, and "array" is used to list the transactions to be queried. For each transaction, an element with the channel name and transaction ID can be created.

An example response header can be illustrated below:
HTTP/1.1 200
Content-Type: application/json Content-Length: 221
Date: Mon, 10 Jul. 2017 01:26:25 GMT
An example response body can be illustrated below:

```
{
"array": [
  {
    "channel": "ChannelXYZ",
    "txid":"245575b55fe15120e42e6a7a389cfe33e5ace9102da4e15cb18cc",
    "returnCode": "Success",
    "info": null
  },
  {
    "channel": "ChannelXYZ",
    "txid": "786255b78932a7e874232d243241223c2e6a7a389b55fe1502da4e15c",
    "returnCode": "Failure", "info": "InvalidTransactionID"
  }
]
}
```

View Version

In accordance with an embodiment, this REST API can be used to retrieve version information of a BCS Gateway, and can be invoked using the command "curl -H Content-type: application/json -X POST -d http://localhost:8080/bcsgw/rest/version".

An example request header in JSON for invoking the REST API can be illustrated below:
GET/bcsgw/version HTTP/1.1
User-Agent: curl/7.29.0
Host: 10.182.53.195:8080
Accept: */*

An header of an example response returned from the invocation of the REST can be illustrated below:
HTTP/1.1 200
Content-Type: application/json
Content-Length: 18
Date: Mon, 10 Jul. 2017 01:26:25 GMT A body of an example response returned from the invocation of the REST can be illustrated below:

```
{
"version": "v1.0"
}
```

Fabric Certificate Authority (Fabric CA) Integrated with Identity Cloud Service (IDCS)

In accordance with an embodiment, fabric-CA server provided the membership service for fabric. It includes three parts: authentication for user, authorization for accessing a Block chain (a group of peers and orders) and CA server which could deliver certificate to application client, peer and order. Fabric-CA use certificate to implement authentication and authorization. The certificate include two types: enroll cert for authentication and transaction cert for authorization. IDCS also provide authentication and authorization. But its authorization is implemented by OAuth. That means if the peer wants to access the order, the peer should get the access token of user from IDCS and use this token to access order.

In accordance with an embodiment, fabric CA uses Database or LDAP to store fabric CA's registered user's info, e.g., user's name/password, user's certification, and user's affiliation. The end user of the Public Cloud (OPC) would apply one centralized IDCS instance to manage their employees to access all of their applied Public Cloud (OPC) instances. The Blockchain Cloud Service BCS preferably integrates with IDCS used for other cloud services. Thus, the end user is enabled to apply one centralized IDCS instance to manage their employees to access all of their applied Public Cloud (OPC) instances, included BCS.

In an embodiment, the Blockchain Cloud Service (BCS) uses ORACLE Identify Cloud Service (IDCS) to store user information in a centralized manner. The BCS stores fabric CA user's information into IDCS and thereby allows ORACLE BCS to use IDCS to manage BCS user's info centralized across multiple Public Cloud service instances. Thus, in an embodiment, BCS fabric CA user's info, certificates, are stored in ORACLE IDCS. The fabric Certificate Authorization framework is a fabric membership provider (MSP) which includes PKI private key, signed certificates, CA certificate chains, and it is set up by fabric CA client/server.

In accordance with an embodiment, BCS leverages the user management of OPC. Any BCS user must be an OPC user (so an IDCS identity) first. When a BCS instance is created, several types of applications are created: BCS console, CA, and REST-proxy. For the console, there are two app Roles: console admin and console user. For CA, there are four app Roles: fabric admin, fabric client, fabric peer, fabric orderer. For REST-proxy, there are at two app Roles: gateway admin, and gateway user.

In accordance with an embodiment, in order to become a BCS user, an OPC user needs to be granted with certain BCS appRoles in OPC user management console.

In accordance with an embodiment, when creating a BCS instance, the creator needs to provide an existing OPC user/password, and this user will be automatically granted with BCS console admin and fabric admin roles so that this user becomes BCS administrator.

Authentication: for BCS console/CA/REST-proxy, the authentication is done at Cloud Gate. For peer/orderer, the authentication is signature based. For BCS console, after authentication, the console gets the appRoles of the current user (by calling IDCS). If the user is not granted with console admin or console user role, the connection is rejected. Otherwise, the console does the access control based on the pre-defined rules, e.g. normal user generally can only read info while admin can do anything.

In accordance with an embodiment, for CA, after authentication, the CA gets the appRoles of the current user. If the user is not granted with any fabric role, the enroll request is rejected.

In accordance with an embodiment, for REST-proxy, after authentication, the REST-proxy gets the appRoles of the current user. If the user is not granted with gateway admin or gateway user role, the request is rejected. Otherwise the REST-proxy does the access control based on pre-defined rules, e.g. normal user can invoke/query, admin can change configuration, get metrics.

In accordance with an embodiment, fabric-CA server provides the membership service for fabric. It includes three parts: authentication for user, authorization for accessing a Block chain (a group of peers and orders) and CA server which could deliver certificate to application client, peer and order.

In accordance with an embodiment, fabric-CA use certificate to implement authentication and authorization. The certificate include two types: enroll cert for authentication and transaction cert for authorization.

In accordance with an embodiment, IDCS also provide authentication and authorization. But its authorization is implemented by OAuth. That means if the peer wants to access the order, the peer should get the access token of user from IDCS and use this token to access order.

Figure 9A:
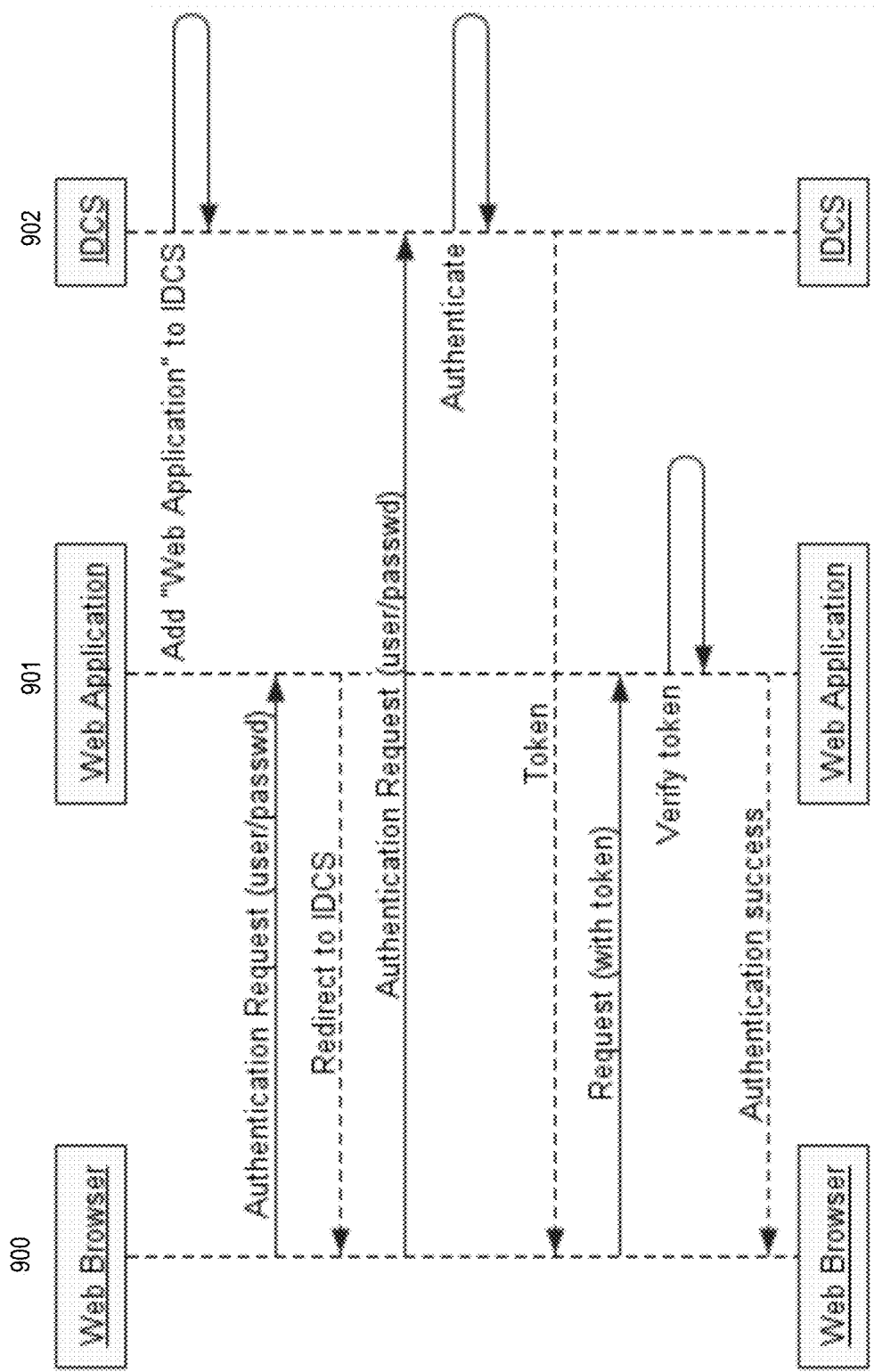
FIG. 9A shows a typical IDCS use case for a single sign-on, in accordance with an embodiment.

FIG. 9A shows a typical IDCS use case for a single sign-on, in accordance with an embodiment.

In accordance with an embodiment, a web application 901 can be added to IDCS 902 at an initial step. Then, a client, such as a web browser 900, can request authentication (e.g., username and password) from the web application. Because the web application has been added to the IDCS, the web application can direct the web browser to make the authentication request to IDCS. After receiving the response from the web application, the web browser can then request authentication (e.g., username and password) from IDCS.

In accordance with an embodiment, IDCS can then authenticate the request and, upon successful authentication, send a token back to the web browser. The web browser, having been authenticated and received its token, can then make a request from the web application. The web application can verify the token, and signal the web browser that authentication was successful.

In the case depicted in FIG. 9A, IDCS acts as the Identity Provider (IdP) to provide identity service for applications. All the communications among all parties are HTTP based. This use case is configuration driven, but only applies to HTTP based application.

Figure 9B:
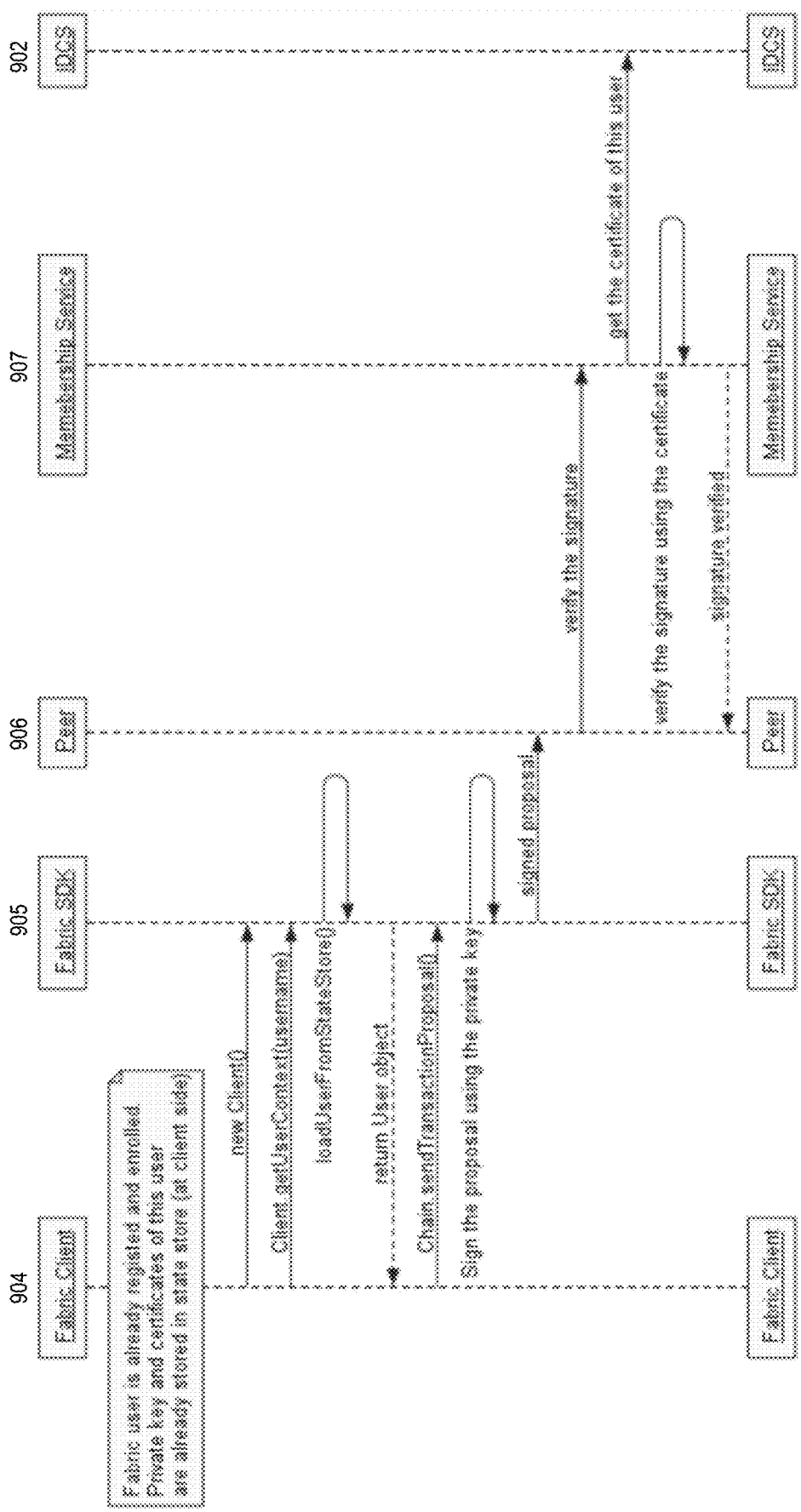
FIG. 9B shows an IDCS use case for fabric Client Authentication, in accordance with an embodiment.

FIG. 9B shows an IDCS use case for fabric Client Authentication, in accordance with an embodiment.

In accordance with an embodiment, a fabric client 904 that is associated with a fabric user that is already registered and enrolled (private key and certificates of this use are already stored in state store at client side) can request a new client( ), as well as getting the user context of the client (username). The fabric SDK 905 can load a user from the state store, and return a user object to the fabric client. The client, upon receiving the user object, can send a transaction proposal to the fabric SDK, which can sign the proposal using the same private key. The signed proposal can then go to the peer (or peers) 906, which will verify the signature at the membership service 907. The membership service can get the certificate for the user from the IDCS 902, and can verify the signature of the user using the certificate from the IDCS. The membership service can then return, to the peers, a verification that the signature is verified.

While various embodiments of the present invention have been described above, it should be understood that they have been presented by way of example, and not limitation. The embodiments were chosen and described in order to explain the features and principles of the invention and its practical application. The embodiments illustrate systems and methods in which the various features of the present invention are utilized to improve the performance of the systems and methods by providing new and/or improved functions, and/or providing performance advantages including, but not limited to, reduced resource utilization, increased capacity, increased throughput, improved efficiency, reduced latency, enhanced security, and/or improved ease of use.

Some embodiments of the present invention are described herein with reference to flowcharts and/or block diagrams of methods, apparatus (systems), and computer program products which illustrate the architecture, functionality, process, and/or operation. Each block in the flowchart or block diagram represents an element, function, process, module, segment, or portion of instructions, which comprises one or more executable instructions for implementing the specified function. In some alternative embodiments, the functions noted in a block diagram or flowchart, occur out of the order noted in the figures. For example, two blocks shown in succession may be executed substantially concurrently, or in the reverse order, depending upon the functionality involved. Each block of the flowcharts and/or block diagrams, and combinations of blocks in the flowcharts and/or block diagrams, can be implemented by computer program instructions, and/or by special purpose hardware, and/or combinations of hardware and computer program instructions, which perform the specified functions.

In some embodiments, features of the present invention are implemented in a computer including a processor, a computer-readable storage medium, and a network card/interface for communicating with other computers. In some embodiments, features of the present invention are implemented in a network computing environment comprising a computing system including various types of computer configurations, including personal computers, hand-held devices, multi-processor systems, microprocessor-based or programmable consumer electronics, network PCs, minicomputers, mainframe computers, and the like interconnected by a network. The network can be a Local Area Network (LAN), switch fabric network (e.g. InfiniBand), Wide Area Network (WAN), and/or the Internet. The network can include copper transmission cables, optical transmission fibers, wireless transmission, routers, firewalls, switches, gateway computers and/or edge servers.

In some embodiments, features of the present invention are implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described herein), or any combination of such back-end, middleware, or front-end components interconnected by a network. The computing system can include clients and servers having a client-server relationship to each other. In some embodiments, features of the invention are implemented in a computing system comprising a distributed computing environment in which one or more clusters of computers are connected by a network. The distributed computing environment can have all computers at a single location or have clusters of computers at different remote geographic locations connected by a network.

In some embodiments, features of the present invention are implemented in the cloud as part of, or as a service of, a cloud computing system based on shared, elastic resources delivered to users in a self-service, metered manner using Web technologies. Characteristics of the cloud may include, for example: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). The cloud generally refers to the combination of hardware, software, network, and web technologies which delivers shared elastic resources to users. The cloud, as used herein, may include public cloud, private cloud, and/or hybrid cloud embodiments, and may include cloud SaaS, cloud DBaaS, cloud PaaS, and/or cloud IaaS deployment models.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention are implemented by circuitry that is specific to a given function. In other implementations, features are implemented in a computer, computing system, processor, and/or network, configured to perform particular functions using instructions stored e.g. on a computer-readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure.

In some embodiments, the present invention includes a computer program product which is a machine-readable or computer-readable storage medium (media) having instructions comprising software and/or firmware stored thereon/in, which instructions can be used to program or otherwise configure a system such as a computer to perform any of the processes or functions of the present invention. The storage medium or computer readable medium can include any type of media or device suitable for storing instructions and/or data including, but not limited to, floppy disks, hard drives, solid state drives, optical discs, DVD, CD-ROMs, microdrives, and magneto-optical disks, ROMs, RAMs, EPROMs, EEPROMs, DRAMs, VRAMs, flash memory devices, magnetic or optical cards, molecular memories, nanosystems, or variations and combinations thereof. In particular embodiments, the storage medium or computer readable medium is a non-transitory machine-readable storage medium or non-transitory computer-readable storage medium.

The foregoing description is not intended to be exhaustive or to limit the invention to the precise forms disclosed. Additionally, where embodiments of the present invention have been described using a particular series of transactions and steps, it should be apparent to those skilled in the art that, unless stated, the embodiment does not exclude performance of additional transactions and steps. Further, while the various embodiments describe particular combinations of features of the invention it should be understood that different combinations of the features will be apparent to persons skilled in the relevant art as within the scope of the invention. In particular, a feature (device-like or method-like) recited in a given embodiment, variant, or shown in a drawing may be combined with or replace another feature in another embodiment, variant or drawing, without departing from the scope of the present invention. Moreover, it will be apparent to persons skilled in the relevant art that various additions, subtractions, deletions, variations, substitutions of elements with equivalents, and other modifications and changes in form, detail, implementation and application can be made therein without departing from the spirit and scope of the invention. It is intended that the broader spirit and scope of the invention be defined by the following claims and their equivalents.

What is claimed:

1. A system for providing a representational state transfer (REST) proxy service in a blockchain cloud service, the system comprising:
   a computer including one or more microprocessors;
   a container runtime service running on the computer, the container runtime service comprising at least one container from a plurality of containers defined within a stack at a repository, wherein each of the plurality of containers comprise a library and a configuration;
   two or more distributed ledgers provisioned in respective containers of the container runtime service, wherein each of the respective containers are started by via a platform service manager application programming interface (API), wherein each distributed ledger is provisioned as a blockchain cloud service in the container runtime service; and
   a REST proxy service executing in another container of the container runtime service, wherein the REST proxy service provides access to client applications to one or more smart contracts provided within the blockchain cloud service within the container, and wherein the REST proxy service exposes one or more functions of a management console associated with one of the provisioned distributed ledgers;
   wherein upon receiving, via a load balancing service, an incoming REST call directed to a smart contract of the one or more smart contracts, the REST proxy authenticates the REST call via an authenticator of the REST proxy.

2. The system of claim 1, wherein the REST proxy service comprises a plurality of application programming interfaces (APIs).

3. The system of claim 2, wherein each of the one or more smart contracts comprise chaincode deployed on one or more peer nodes of the blockchain cloud service.

4. The system of claim 3,
   wherein an API of the plurality of APIs of the REST proxy service is utilized to interact with the smart contract of the one or more smart contracts; and
   wherein the REST proxy service, while being utilized to interact with a smart contract, translates an incoming REST call directed to the smart contract.

5. The system of claim 4,
   wherein the interaction with the smart contract is performed synchronously with the translation of the incoming REST call.

6. The system of claim 4,
   wherein the interaction with the smart contract is performed asynchronously with the translation of the incoming REST call.

7. The system of claim 1, wherein at least one of the provisioned distributed ledgers comprises a HYPERLEDGER FABRIC.

8. A method for providing a representational state transfer (REST) proxy service in a blockchain cloud service, the system comprising:
   providing a computer including one or more microprocessors;
   providing a container runtime service running on the computer, the container runtime service comprising at least one container from a plurality of containers defined within a stack at a repository, wherein each of the plurality of containers comprise a library and a configuration;
   provisioning two or more distributed ledgers in respective containers of the container runtime service, wherein each of the respective containers are started by via a platform service manager application programming interface (API), wherein each distributed ledger is provisioned as a blockchain cloud service in the container runtime service;
   executing a REST proxy service in another container of the container runtime service, wherein the REST proxy service provides access to client applications to one or more smart contracts provided within the blockchain cloud service within the container, and wherein the REST proxy service exposes one or more functions of a management console associated with one of the provisioned distributed ledgers; and
   upon receiving, via a load balancing service, an incoming REST call directed to a smart contract of the one or more smart contracts, authenticating, by the REST proxy, the REST call via an authenticator of the REST proxy.

9. The method of claim 8, wherein the REST proxy service comprises a plurality of application programming interfaces (APIs).

10. The method of claim 9, wherein each of the one or more smart contracts comprise chaincode deployed on one or more peer nodes of the blockchain cloud service.

11. The method of claim 10,
wherein an API of the plurality of APIs of the REST proxy service is utilized to interact with a smart contract of the one or more smart contracts; and
wherein the REST proxy service, while being utilized to interact with a smart contract, translates an incoming REST call directed to the smart contract.

12. The method of claim 11,
wherein the interaction with the smart contract is performed synchronously with the translation of the incoming REST call.

13. The method of claim 11,
wherein the interaction with the smart contract is performed asynchronously with the translation of the incoming REST call.

14. The method of claim 8, wherein at least one of the provisioned distributed ledgers comprises a HYPERLEDGER FABRIC.

15. A non-transitory computer readable storage medium having instructions thereon for providing a representational state transfer (REST) proxy service in a blockchain cloud service, which when read and executed cause a computer to perform steps comprising:
providing a computer including one or more microprocessors;
providing a container runtime service running on the computer, the container runtime service comprising at least one container from a plurality of containers defined within a stack at a repository, wherein each of the plurality of containers comprise a library and a configuration;
provisioning two or more distributed ledgers in respective containers of the container runtime service, wherein each of the respective containers are started by via a platform service manager application programming interface (API), wherein each distributed ledger is provisioned as a blockchain cloud service in the container runtime service;
executing a REST proxy service in another container of the container runtime service, wherein the REST proxy service provides access to client applications to one or more smart contracts provided within the blockchain cloud service within the container, and wherein the REST proxy service exposes one or more functions of a management console associated with one of the provisioned distributed ledgers; and
upon receiving, via a load balancing service, an incoming REST call directed to a smart contract of the one or more smart contracts, authenticating, by the REST proxy, the REST call via an authenticator of the REST proxy.

16. The non-transitory computer readable storage medium of claim 15, wherein the REST proxy service comprises a plurality of application programming interfaces (APIs).

17. The non-transitory computer readable storage medium of claim 16, wherein each of the one or more smart contracts comprise chaincode deployed on one or more peer nodes of the blockchain cloud service.

18. The non-transitory computer readable storage medium of claim 17,
wherein an API of the plurality of APIs of the REST proxy service is utilized to interact with a smart contract of the one or more smart contracts;
and
wherein the REST proxy service, while being utilized to interact with a smart contract, translates an incoming REST call directed to the smart contract.

19. The non-transitory computer readable storage medium of claim 18,
wherein the interaction with the smart contract is performed synchronously with the translation of the incoming REST call.

20. The non-transitory computer readable storage medium of claim 18,
wherein the interaction with the smart contract is performed asynchronously with the translation of the incoming REST call.

\* \* \* \* \*

UNITED STATES PATENT AND TRADEMARK OFFICE
CERTIFICATE OF CORRECTION

PATENT NO. : 11,636,095 B2
APPLICATION NO. : 16/704976
DATED : April 25, 2023
INVENTOR(S) : Li et al.

It is certified that error appears in the above-identified patent and that said Letters Patent is hereby corrected as shown below:

On the Title Page

On page 3, Column 1, under Item (56) Other Publications, Line 6, delete "InResearch" and insert -- In Research --, therefor.

On page 3, Column 1, under Item (56) Other Publications, Line 11, delete "Sachin," and insert -- Cachin, --, therefor.

On page 3, Column 1, under Item (56) Other Publications, Line 42, delete "Ja" and insert -- Js --, therefor.

In the Drawings

On sheet 1 of 18, in FIGURE 1A, under Reference Numeral 168, Line 1, delete "Contact" and insert -- Contract --, therefor.

On sheet 2 of 18, in FIGURE 1B, under Reference Numeral 130, Line 1, delete "Fabric-Ca" and insert -- Fabric-CA --, therefor.

On sheet 3 of 18, in FIGURE 1C, under Reference Numeral 130, Line 2, delete "Fabric-ca" and insert -- Fabric-CA --, therefor.

On sheet 3 of 18, in FIGURE 1C, under Reference Numeral 140, Line 3, delete "(ephermeral)" and insert -- (ephemeral) --, therefor.

On sheet 10 of 18, in FIGURE 6, under Reference Numeral 130, Line 1, delete "Fabric-Ca" and insert -- Fabric-CA --, therefor.

On sheet 14 of 18, in FIGURE 8A, under Reference Numeral 130, Line 1, delete "Fabric-Ca" and insert -- Fabric-CA --, therefor.

Signed and Sealed this
Twentieth Day of February, 2024

Katherine Kelly Vidal
*Director of the United States Patent and Trademark Office*

CERTIFICATE OF CORRECTION (continued)
U.S. Pat. No. 11,636,095 B2

On sheet 15 of 18, in FIGURE 8B, under Reference Numeral 130, Line 1, delete "Fabric-Ca" and insert -- Fabric-CA --, therefor.

On sheet 18 of 18, in FIGURE 9B, under Reference Numeral 907, Line 1, delete "Memebership" and insert -- Membership --, therefor.

On sheet 18 of 18, in FIGURE 9B, under Reference Numeral 907, Line 17, delete "Memebership" and insert -- Membership --, therefor.

In the Specification

In Column 2, Line 26, delete "(10T." and insert -- (IOT). --, therefor.

In Column 6, Line 29, delete "Hyperledger Fabric" and insert -- HYPERLEDGER FABRIC --, therefor.

In Column 10, Line 67, delete "fabric-CA" and insert -- Fabric-CA --, therefor.

In Column 11, Line 6, delete "Hyperledger Fabric" and insert -- HYPERLEDGER FABRIC --, therefor.

In Column 12, Line 47, delete "chain 1" and insert -- chain1 --, therefor.

In Column 16, Line 15, delete "an container" and insert -- of container --, therefor.

In Column 19, Line 38, delete "next," and insert -- Next, --, therefor.

In Column 23, Line 39, delete "requests;" and insert -- requests. --, therefor.

In Column 26, Line 4, delete "step" and insert -- (step --, therefor.

In Column 32, Line 56, delete "FIG. 8" and insert -- FIGs. 8A and 8B --, therefor.